US007838666B2

(12) United States Patent
Yaginuma et al.

(10) Patent No.: US 7,838,666 B2
(45) Date of Patent: Nov. 23, 2010

(54) WATER-DISPERSIBLE CELLULOSE AND PROCESS FOR PRODUCING THE SAME

(75) Inventors: Yoshihito Yaginuma, Nobeoka (JP); Nobuyoshi Mochihara, Nobeoka (JP); Yurika Tanaka, Nobeoka (JP); Tetsuya Ootani, Nobeoka (JP); Kouichirou Enatsu, Nobeoka (JP); Mitsuyo Akimoto, Nobeoka (JP); Akihiro Sakamoto, Nobeoka (JP)

(73) Assignee: Asahi Kasei Kabushik Kaisha, Osaka (JP)

( * ) Notice: Subject to any disclaimer, the term of this patent is extended or adjusted under 35 U.S.C. 154(b) by 713 days.

(21) Appl. No.: 10/520,677

(22) PCT Filed: Jul. 10, 2003

(86) PCT No.: PCT/JP03/08793

§ 371 (c)(1),
(2), (4) Date: Jan. 11, 2005

(87) PCT Pub. No.: WO2004/007558

PCT Pub. Date: Jan. 22, 2004

(65) Prior Publication Data

US 2005/0272836 A1 Dec. 8, 2005

(30) Foreign Application Priority Data

Jul. 12, 2002 (JP) .............................. 2002-204740

(51) Int. Cl.
*C08B 1/00* (2006.01)
*A23G 3/00* (2006.01)
(52) U.S. Cl. ........................................ 536/56; 426/658
(58) Field of Classification Search .................. 536/56; 426/658
See application file for complete search history.

(56) References Cited

U.S. PATENT DOCUMENTS

| 3,146,168 | A | * | 8/1964 | Battista | ........................ | 424/526 |
| 4,483,743 | A | * | 11/1984 | Turbak et al. | ................ | 162/100 |
| 4,487,634 | A | | 12/1984 | Turbak et al. | | |
| 4,714,620 | A | * | 12/1987 | Bunick et al. | ................ | 426/572 |
| 5,964,983 | A | * | 10/1999 | Dinand et al. | .................. | 162/27 |
| 6,103,790 | A | * | 8/2000 | Cavaille et al. | ................ | 524/13 |

FOREIGN PATENT DOCUMENTS

| EP | 1036799 | | 9/2000 |
| JP | 56-100801 | | 8/1981 |
| JP | 58013713 | A * | 1/1983 |
| JP | 60-186548 | | 9/1985 |
| JP | 61-215601 | | 9/1986 |
| JP | 3-157402 | | 7/1991 |
| JP | 8-284090 | | 10/1996 |
| JP | 8-291201 | | 11/1996 |
| JP | 9-59302 | | 3/1997 |
| JP | 9-124702 | | 5/1997 |
| JP | 11-501684 | | 2/1999 |
| JP | 11-209401 | | 8/1999 |
| JP | 11-302448 | | 11/1999 |
| JP | 2000-503704 | | 3/2000 |
| JP | 2000-512850 | | 10/2000 |
| WO | 96/24720 | | 8/1996 |
| WO | 97/12917 | | 4/1997 |
| WO | WO 9902568 A1 * | | 1/1999 |

OTHER PUBLICATIONS

Nishinari, "New Studies and Uses of Gelling Agents for Food," Monthly Food Chem., Apr. 1998, pp. 75-82.
Supplementary European Search Report issued on Apr. 4, 2007 in correspondence to European Patent Application 03741330.9-1214.
Tatsumi et al., "Effect of Fiber Concentration and Axial Ratio on the Rheological Properties of Cellulose Fiber Suspensions", Journal of Society of Rheology, Japan, 2002, vol. 30, No. 1, pp. 27-32.

* cited by examiner

*Primary Examiner*—Shaojia Anna Jiang
*Assistant Examiner*—Everett White
(74) *Attorney, Agent, or Firm*—Staas & Halsey LLP

(57) ABSTRACT

A material is provided to give food products sufficient viscosity and stability (heat resistance, stable suspension, etc.). The material is produced from an inexpensive raw material by an economical process. Further, a novel gel containing cellulose as the main component is also provided.

The present invention provides a fine fibrous water-dispersible cellulose derived from plant cell walls. For the production, a raw material having specific properties is used, and size reduction is carried out stepwise thereto. The water-dispersible cellulose can also be made into a dry composition by compounding with a water-soluble polymer or the like. This dry composition forms a gel when combined with a polysaccharide such as glucomannan or the like. The gel excels in heat-resistance and shape-retention and can be used to produce to novel food products.

5 Claims, No Drawings

WATER-DISPERSIBLE CELLULOSE AND PROCESS FOR PRODUCING THE SAME

TECHNICAL FIELD

The present invention relates to a water-dispersible cellulose, a dry composition thereof, and a process for producing the same. Further, the present invention mainly relates to a novel gel composition which provides food products in the form of a liquid, sol, gel, paste, or solid with stability with respect to heat resistance, emulsification, suspension, thickening, shelf life, etc. and further with an improved mouth-feel and heat resistance. The present invention also rebtes to a sponge-like gel having a novel mouth-feel.

BACKGROUND ART

Cellulose type materials are known for use in food products, cellulose powder, microcrystalline cellulose, microfibrillated cellulose (MFC), microbial cellulose (bacteria cellulose, microreticulated cellulose), etc.

Cellulose powder has a large particle size. Accordingly, when blended into a food product that has a low solids concentration, such as drinks, or a food product with a soft mouth-feel, cellulose powder often gives a rough feel upon eating. Thus, its use is limited to shredded cheese (for the prevention of coagulation), cookies (for the improvement of shape retention upon baking), etc.

With respect to microcrystalline cellulose, a new grade of microcrystalline cellulose that disintegrates into small particles in water has been developed. It hardly gives a rough feeling and particularly serves to provide, among others, suspension stability for liquid food products. However, it is characterized by relatively low viscosity, so that it has to be used in a great amount when used as a thickener.

As microfibrillated cellulose, those disclosed in JP-A-56-100801, JP-A-61-215601, JP-A-60-186548, JP-A-9-59302, etc. are known. These are fundamentally produced by passing a suspension of cellulose material through an orifice with a small diameter a number of times while applying a pressure difference of 3,000-8,000 psi (about 21 to about 56 MPa) or 100 kg/cm$^2$ (about 10 MPa) or more. However, under such a pressure difference, microfibrillation cannot progress sufficiently even if the treatment is repeated many times, a large amount of material remains. Accordingly, the mouth feel is adversely affected by the rough and grating feeling. Further, since the absolute quantity of the microfibrillated component is small, it cannot give sufficient viscosity and stability to a food product in many cases.

As a further improvement of the above-mentioned technique, super-microfibrillated cellulose can be referred to, as in JP-A-8-284090. First of all, in this technique, pulp is used as a starting material and it does not matter whatever the species of the original tree is and whatever the method of pulp making is. The starting pulp is preliminarily beaten with a beating machine (beater, Jordin, conical refiner, single disk refiner, double disk refiner, etc.). When the number-average fiber length as measured by the fiber length distribution measurement device (FS-200) manufactured by KAJAANI Co. is 0.8 mm or more, the preliminary beating is carried out until the freeness reaches 400 ml CSF or less. When the number-average fiber length is less than 0.8 mm, the preliminary beating is carried out until freeness reaches 600 ml CFS or less. Then, using an abrasive grain plate type grinding apparatus equipped with an abrasive grain plate composed of abrasive grains having a grain size of No. 16-120 ("Super-grindell" manufactured by Masukou Sangyo K. K.), the freeness is reduced to 300 ml CSF or less. Further, by processing it with a high pressure homogenizer ("Nanomizer" manufactured by Nanomizer Co., Ltd.; "Microfluidizer" manufactured by Microfluidics Co., Ltd.; etc.) at a pressure of 500-2,000 kg/cm$^2$ (about 49-196 MPa), a "super microfibrillated cellulose" having a water retention of 350% or more as determined according to the method indicated in JAPAN TAPPI No. 26, and a number-average fiber length of 0.05-0.1 mm, wherein 95% or more of the integrated fiber number based on the total fiber number has a number-average fiber length of 0.25 mm or less, and the axial ratio of the fiber is 50 or more, can be prepared. According to the JP-A-8-284090 reference, the cellulose particle has "a fiber width of 1 μm or less and the shortest fiber has a fiber length of about 50 μm" as measured by a direct observation using an optical microscope and an electron microscope and, thus, "the axial ratio is 50 or more".

Although this super-microfibrillated cellulose is suitable for use as an additive to be blended into a coating material for the manufacture of coated paper or a dye or pigment carrier for the manufacture of dyed paper, it contains too large an amount of thick and long fiber component to be used as a material for food products. On the other hand, since the content of fine components that is stably suspensible in water is too low, it fails to give a sufficient stabilizing effect on food products, and, further, gives an unpleasant mouth feel such as roughness to food products. Regarding the fineness of fiber and water-suspension stability brought about thereby, the applicability of the fiber as a material for food products is limited, unless the fineness reaches such a degree that the openings of sieves are clogged making the measurement impossible. Alternatively, all the components pass through the sieve making impossible to obtain any value in the filtration for the water retention measurement as prescribed in JAPAN TAPPI No. 26.

There has also been disclosed a microfibrillated cellulose prepared from beet pulp (JP-A-11-501684). Although this substance is called "cellulose", it is actually an associated substance of cellulose and pectin or hemicellulose present in beet pulp, which is a main cause of its characteristics, such as high viscosity. Although the pectin and the hemicellulose are defined by "electric charging due to carboxylic acid", their actual chemical compositions are unknown.

In JP-A-2000-503704, a composition is disclosed wherein cellulose nanofibril is obtained from cells comprising about 80% or more of primary wall and the other additives (30% by weight or less). Although this "cellulose nanofibril" is regarded as substantially the same technique as in JP-A-11-501684, the only difference is that the use of pure cellulose is disclosed. In the JP-A-11-501684 reference, the meaning of using "cells comprising primary wall" as a raw material seems to lie in the degree of crystallinity. In other words, cellulose microfibril derived from secondary wall (for example, wood) has a high crystallinity (higher than 70%) and therefore cannot be made thinner than several tens of nm to several μm. On the other hand, the main object of JP-A-11-501684 is "supplement addition to food products and the like for the purpose of providing some functions of substantially non-crystalline (crystallinity 50% or less) cellulose nanofibril". Accordingly, the "cellulose nanofibril obtained from cells comprising primary walls of about 80% or more" can be substantially interpreted as "that having a crystallinity of 50% or less".

Microbial cellulose is also referred to by other names such as bacterial cellulose, bacterial microreticulated cellulose, and fermentation cellulose. Microbial celluloses are produced by the micro-organisms belonging to Genus *Acetobacter*, Genus *Gluconobacter*, Genus *Pseudomonas*, Genus

*Agrobacterium*, etc. This cellulose has a very high purity, and is released out of the microbial cells in the form of well-grown microfibril. For this reason, it is easy to purify and, as a result, the product has a high crystallinity and is useful as a material for crystalline structural analysis of cellulose. Since the cellulose has a unique microfibril structure different from that of other plant cell wall-derived celluloses, its application for an acoustical material, a paper-making additive, and a food additive have been studied. In the application for food products, a thickening function or a suspension-stabilizing function have been recognized. There have been attempts to add a specific polymeric substance to a medium for culturing a micro-organism, or to culture the mixture while agitating it, or to dissociate the product thus obtained, or to use the product as a re-dispersible dry powder (JP-A-3-157402, JP-A-8-291201, and JP-A-2000-512850). However, the production of cellulose by the culture of micro-organism has not yet been established as an economical production technique, since the problems of high cost, low production speed of cellulose, etc., remain unsolved.

It is an object of the present invention to provide a cellulosic material capable of providing a sufficient thickening effect and stabilizing effect (namely, heat resistance, suspension stability and emulsion stability) to food products without adversely affecting the mouth feel thereof by an economical process. Further, it is another object of the present invention to provide a novel gel composition composed mainly of cellulose.

SUMMARY OF THE INVENTION

The inventors have found that the problems mentioned above can be solved by using a cellulosic material having specific properties, carrying out a stepwise size reduction, and preparing an aqueous dispersion of microfibrillated cellulose having a specific dynamic viscoelasticity.

The present invention relates to the following embodiments.

A water-dispersible cellulose,
the cellulose being derived from a plant cell wall, crystalline and fine fibrous, and having 30% by weight or more of a component stably suspensible in water and having a loss tangent of less than 1, when made into a 0.5% by weight aqueous dispersion.

The water-dispersible cellulose includes 50% by weight or more of the component stably suspensible in water and having the loss tangent of less than 0.6, when made into a 0.5% by weight aqueous dispersion.

An aqueous suspension-form composition, having:
the water-dispersible cellulose mentioned above in an amount of 0.0005-7% by weight and water.

A water-dispersible dry composition, having:
the water-dispersible cellulose mentioned above in an amount of 50-95% by weight and a water-soluble polymer and/or a hydrophilic substance in an amount of 5-50% by weight.

The water-dispersible dry composition further has a loss tangent of less than 1, when made into a 0.5% by weight aqueous dispersion.

In the water-dispersible dry composition mentioned above, the water-soluble polymer is sodium carboxymethyl cellulose.

A gel-forming composition, having:
the water-dispersible dry composition mentioned above and at least one polysaccharide selected from the group consisting of alginic acids, galactomannan and glucomannan.

A gel composition, having:
the water-dispersible cellulose mentioned above, the aqueous suspension-form composition also mentioned above or the water-dispersible dry composition mentioned above as well, and at least one polysaccharide selected from the group consisting of alginic acids, galactomannan and glucomannan.

For the gel composition mentioned above, the polysaccharide is glucomannan, and the composition was a sponge-like structure and be edible.

A process for producing the water-dispersible cellulose or the aqueous suspension-form composition, having at least the following steps (1) to (3):
(1) preparing an aqueous dispersion of a cellulose fibrous particle having a length of 4 mm or less from a cellulosic substance derived from a plant cell wall which has an average degree of polymerization of 400 or higher and an α-cellulose content of 60-100% by weight, provided that the cellulosic substance having an average degree of polymerization lower than 1,300 and an α-cellulose content of more than 90% by weight are excepted;
(2) fiber-shortening and micronizing of the cellulose fibrous particle in the aqueous dispersion of (1) so that a sedimentation volume thereof becomes 70% by volume or more; and
(3) treating the aqueous dispersion containing the cellulose fibrous particle obtained in (2) by a high-pressure homogenizer at 60-414 MPa.

In step (3) of the above process, the concentration of the aqueous dispersion is 0.1-5% by weight, the pressure of the treatment is 70-250 MPa, and the treatment is repeated 6 times or less.

In the process for producing the aqueous suspension-form composition, step (1) is further includes blending a water-soluble polymer and/or a hydrophilic substance.

In the process for producing an aqueous suspension-form composition, the water-soluble polymer is sodium carboxymethyl cellulose.

A process for producing the water-dispersible dry composition, having at least the following steps (1)-(5)
(1) preparing an aqueous dispersion of a cellulose fibrous particle having a length of 4 mm or less from a cellulosic substance derived from a plant cell wall which has an average degree of polymerization of 400 or higher and an α-cellulose content of 60-100% by weight, provided that the cellulosic substance having an average degree of polymerization of lower than 1,300 and an α-cellulose content exceeding 90% by weight are excepted;
(2) fiber-shortening and micronizing the cellulose fibrous particle in the aqueous dispersion of (1) so that a sedimentation volume thereof becomes 70% by volume or more;
(3) treating the aqueous dispersion containing the cellulose fibrous particle obtained in (2) by a high-pressure homogenizer at 60-414 MPa;
(4) blending a water-soluble polymer and/or a hydrophilic substance into the aqueous dispersion treated in (3); and
(5) drying the aqueous dispersion obtained in (4).

In the process for producing a water-dispersible dry composition mentioned above, the water-soluble polymer is sodium carboxymethyl-cellulose.

A food composition, having:
the water-dispersible cellulose, the aqueous suspension-form composition, the water-dispersible dry composition, or the gel-forming composition.

A method for stabilizing a milk component-containing drink, having the following steps:

blending the water-dispersible cellulose, the aqueous suspension-form composition, or the water-dispersible dry composition into the milk component-containing drink.

DETAILED DESCRIPTION OF THE INVENTION

Hereinbelow, various embodiments of the present invention will be described in detail.

The water-dispersible cellulose proposed by the inventors may use, as a starting material, a cellulosic substance originating from the plant cell wall. Concretely, the industrially usable cellulosic substances, such as a pulp composed mainly of natural celluloses, such as woods from coniferous trees, and broad leaved trees, cotton linter, kenaf, Manila hemp (abaca), sisal, jute, Savaii grass, esparto grass, bagasse, rice plant straw, wheat straw, reed, bamboo, etc, can be preferably used. Since these pulps composed mainly of natural cellulose are low in cost and stably available, the products therefrom can be economically supplied to the market. Microbial cellulose which is a cellulosic substance not originating from the plant cell wall is not encompassed in the starting material of the present invention, because there have been problems in the stability of its supply and cost.

Although raw cotton, papilus grass, paper mulberry, paper bush, gampi, etc., are also usable, their use is sometimes not preferred because these raw materials are difficult to obtain stably, they contain non-cellulose components in a large amount, and they are difficult to handle. The same applies to the soft cell-derived starting materials such as beet pulp, fruit fiber pulp, etc. When regenerated cellulose is used as a starting material, no sufficient performance can be exhibited. Accordingly, regenerated cellulose is not included among the starting materials of the present invention.

The water-dispersible cellulose is composed fine-fibrous cellulose. As used herein, the term "fine-fibrous" means that fiber length (major axis) is about 0.5 μm to 1 mm, fiber width (minor axis) is about 2 nm to 60 μm, and the ratio of length to width (major axis/minor axis) is about 5-400, as observed and measured by an optical microscope and an electron microscope.

The water-dispersible cellulose is crystalline. Concretely, the crystallinity as measured on a dried sample by X ray diffraction method (Siegel method) exceeds 50%, and is preferably 55% or more. In the case of the aqueous suspension-form composition, crystallinity is also measured on dried sample. In the case of the water-dispersible dry composition, the measurement of crystallinity is carried out on the composition as it is. When the sample contains a water-soluble polymer or the like, these components are non-crystalline, so that they are counted as non-crystalline. Even in such cases, a water-dispersible cellulose can be said to have a crystallinity exceeding 50%, as long as the over-all crystallinity is 50% or more. If the overall crystallinity is 49%, for example, the water-dispersible cellulose must be separated from other components to measure its crystallinity.

The water-dispersible cellulose of the present invention contains a component stably suspensible in water. As used herein, the term "component stably suspensible in water" concretely means a component which is stably suspended in water without sedimentation, even when it is made into an aqueous dispersion having a concentration of 0.1% by weight and the resulting dispersion is centrifuged at 1,000 G for 5 minutes. Such a component comprises a fibrous cellulose having a length (major axis) of 0.5-30 μm and a width (minor axis) of 2-600 nm, and a length/width ratio (major axis/minor axis) of 20-400, as observed and measured by a high-resolution scanning electron microscopy (SEM). The width is preferably 100 nm or less and more preferably 50 nm or less.

Usually, an aqueous dispersion system of cellulose particles is characterized by white turbidity, and due to the whiteness it may be used as a clouding agent for food products. However, according to a preferable embodiment of the present invention in which almost all components have a width of 100 nm or less, the optical transmission of the aqueous dispersion system increases and, thus, the transparency increases. The "component stably suspensible in water" constitutes the most important element of the present invention, which is the cause of the property of thickening the system, the property of stably suspending solid fine particles in water, the property of improving heat stability of emulsion system, the property of interacting with other polysaccharides to form a gel, etc.

The water-dispersible cellulose contains the "component stably suspensible in water" in an amount of 30% by weight or more based on the total cellulose. If the content of the component is less than 30% by weight, the above-mentioned functions such as thickening, etc. cannot be exhibited sufficiently. The higher the content of this component, the more preferable. It is, however, more preferable that the content of this component is 50% by weight or more. For the aqueous suspension-form composition and water-dispersible dry composition of the present invention, 30% by weight or more of the total cellulose contained in the composition is the component that is stably suspensible in water.

The water-dispersible cellulose of the present invention, when made into an aqueous dispersion having a concentration of 0.5% by weight, exhibits a loss tangent (tan δ) of less than 1 and preferably less than 0.6, as measured at a strain 10% and frequency 10 rad/s. The value of loss tangent indicates the dynamic viscoelasticity of an aqueous dispersion. The lower the value, the more gelatious the aqueous dispersion is. In an aqueous solution of polymer, the term "gel or gelations" is considered to mean a state where the solute (polymer chain) forms a three-dimensional network structure to immobilize (solidify) the solvent (water). In the case of gel-forming water-soluble polymers, it is generally considered that loss tangent takes a value of 1 or more at a low concentration, while it decreases with any increase of the polymer concentration to reach a value smaller than 1 at a gel-forming concentration. On the other hand, the water-dispersible cellulose of the present invention, under the above-mentioned measurement conditions, has a loss tangent smaller than 1, but has fluidity, so that it is not a gel in the true sense. That is, this means that, under a condition of low strain or low frequency, the dispersant (fine-fibrous cellulose) forms a three-dimensional network structure and exhibits a property of solidifying the dispersion medium (water), namely a gel nature. If the loss tangent is not smaller than 1, suspensibility and gel-forming property with other polysaccharides as mentioned hereinbelow become inferior. When the loss tangent is smaller than 0.6, these properties become further superior.

The water-dispersible cellulose of the present invention can be used not only in the state of being mixed with a liquid (a dispersed state) but also in the state of a solid (powder). The cellulose is preferably mixed with water (dispersed in water). Although in this case the water content is preferably smaller from the viewpoint of transportation, the water content of 80% by weight or more is preferable from the viewpoint of ease in blending (dispersing) the cellulose into water or food products. As liquids other than water, hydrophilic liquids, such as ethanol or glycerin can be used for a similar purpose. A preferable embodiment is an aqueous suspension-form composition in the form of a slurry or paste, comprising 0.0005-7% by weight of the water-dispersible cellulose and water, which is excellent in handling property and blending property into food products. When the amount of the water-dispersible cellulose is less than 0.0005% by weight, the composition is hardly different from water and there is no effect at all. When the amount of the water-dispersible cellulose is more than 7% by weight, the composition loses fluidity, so that it is difficult to handle.

Into the water-dispersible cellulose and aqueous suspension-form composition of the present invention, ingredients conventionally used in food products, such as a monosaccharide, an oligosaccharide, a sugar-alcohol, a starch, a soluble starch, a starch hydrolyzate, an oil or a fat, a protein, a salt such as an edible salt and a various phosphoric acid salt, an emulsifier, a thickener, a stabilizer, a gelling agent, a souring agent, a preservative, a bactericide, an antioxidant, a fungicide, a pot-life improver, spices, food colors, and the like may optionally be blended. In the case of the aqueous suspension-form composition, however, such ingredients may be blended at most in an amount of about 13% by weight. If the amount is more than that, the composition has too high a solids content as a whole, its fluidity decreases, and it becomes difficult to handle. That is to say, in the case of the aqueous suspension-form composition, the preferable composition is: water-dispersible cellulose 0.0005-7% by weight; water 80-99.9995% by weight; and other ingredients 0-13% by weight.

The water-dispersible cellulose and aqueous suspension-form composition of the present invention are quite high in suspension stability in water. Accordingly, their water-retention (JAPAN TAPPI Paper-Pulp Testing Method No. 26) and freeness (JIS P 8121) cannot be measured by the procedures applicable to prior microfibrillated cellulose.

To measure the water retention, when an aqueous suspension containing cellulose in the amount corresponding to an absolute dry weight of 0.5 g is poured into a metallic cup filter equipped with a metallic wire ($\phi$20 mm) having a sieve opening of 74 μm and the suspension is slowly sucked with an aspirating device, a sample has to form a uniform mat. Even under such conditions, however, the products of the present invention cannot form a mat because of clogging, or passing through the metallic wire. When the clogging takes place, even if it is subjected to a subsequent centrifugation at 3,000 G for 15 minutes, dehydration does not occur but a separate water layer is formed as an upper layer.

Further, the measurement of freeness (Canadian standard), involves a filtration with a brass sieving plate (with a thickness of 0.51 mm and holes with a diameter of 0.51 mm exist in a number of 969 per 1,000 mm$^2$ of the surface). In this measurement, the extent of beating of the cellulose fiber is evaluated on the basis of the fact that, when a 0.3% by weight aqueous dispersion of cellulose (pulp) fiber is passed through the sieve, the cellulose fiber is laminated on the sieve plate to change the falling speed of water. When the freeness of the product of the present invention is measured, the water-dispersible cellulose passes the sieve plate without remaining thereon. Though detailed description is omitted here, freeness becomes smaller with the progress of beating (hereinafter, referred to as micro-fibrillation) of cellulose fiber. When the fiber becomes excessively short and thin as a pulp fiber for paper making, the fiber comes to pass the sieve plate, and, thus gradually comes to have higher freeness. That is to say, with the progress of micro-fibrillation, freeness decreases at first but increases thereafter. Considering the purpose and principle of the measurement, it is not appropriate to carry out such measurements in the case where a cellulose fiber has become extremely fine.

Based on the above, it can be understood that, in the conventional microfibrillated celluloses, the extent of the finess of the fiber is not as high as that in the product of the present invention, because water-retention and freeness could be measured on the conventional microfibrillated celluloses. Thus, it can be said that the product of the present invention is distinguished from the conventional microfibrillated celluloses.

The water-dispersible dry composition of the present invention is a dry product comprising 50-95% by weight of a water-dispersible cellulose and 5-50% by weight of a water-soluble polymer and/or a hydrophilic substance, and is in the form of granule, grain, powder, scale, small scale, or sheet. This composition is characterized in that, when the composition is thrown into water and a mechanical shearing force is applied thereto, the particles, etc. are disintegrated to allow microfibrillated cellulose to disperse into the water. When the content of the water-dispersible cellulose is less than 50% by weight, the proportion of cellulose is too low to bring about an effect of thickening, stabilization, etc. When the content of the water-dispersible cellulose exceeds 95% by weight, the proportions of other ingredients becomes relatively low and, thus, sufficient dispersibility in water cannot be ensured. From the viewpoint of ensuring the extent of the function to be provided and the dispersibility in water, a preferable amount of water-dispersible cellulose to be blended is 65-90% by weight, and a preferable amount of the water-soluble polymer and/or hydrophilic substance to be blended is 10-35% by weight.

For the conventional microfibrillated celluloses, it has also been attempted to prepare a similar dry composition therefrom (JP-A-59-189141; JP-A-60-44537; JP-A-60-186548; JP-A-9-59301). All the dry compositions, however, when thrown into water, could not provide the microfibrillated cellulose reconstituted to the state before the drying. This is considered to be due to insufficient micro-fibrillation of the fiber so that many branched bundles of fiber exist, which are apt to be cornified (coalescence) at the time of drying. On the other hand, the water-dispersible cellulose of the present invention has very fine fibrous constitutional units and hardly contains branched bundles of fiber.

It is therefore considered that the effect of preventing cornification of the water-soluble polymer can act effectively. Probably for this reason, the water-dispersible cellulose in the present invention is readily reconstituted into a state comparable to that of before drying by dispersion in water.

The water-soluble polymer used in the present invention is a substance having an activity of preventing the cornification of cellulose upon drying. Concretely, one, two or more substances selected from gum arabic, arabinogalactan, alginic acid and salts thereof, Curdlan, Gum ghatti, carrageenan, karaya gum, agar, xanthan gum, guar gum, enzymatically-hydrolyzed guar gum, quince seed gum, gellan gum, gelatin, tamarind seed gum, indigestible dextrin, tragacanth gum, Furcellaran, pullulan, pectin, Locust bean gum, water-soluble soybean polysaccharide, sodium carboxymethyl cellulose, methylcellulose, sodium polyacrylate and the like are used.

Among these substances, sodium carboxymethyl-cellulose is especially preferable. As the sodium carboxymethyl-celllulose, those having the degree of substitution of carboxymethyl groups of 0.5-1.5 and viscosity, when made into a 1% by weight aqueous solution, of about 5-9,000 mPa·s are preferably used, and those having the degree of substitution of carboxymethyl groups of 0.5-1.0 and viscosity, when made into a 1% by weight aqueous solution, of about 1,000-8,000 mPa·s are further preferably used.

The hydrophilic substance used in the present invention means a substance having a high solubility in cold water, hardly imparting a viscosity, and being solid at an ambient temperature. As the hydrophilic substance, one, two or more substances selected from dextrins, water-soluble sugars (glucose, fructose, sucrose, lactose, isomerized sugar, xylose, trehalose, coupling sugar, paratinose, sorbose, reduced starch-saccharified gluten, maltose, lactulose, fructo-oligosaccharide, galacto-oligosaccharide), sugar alcohols (xylitol, maltitol, mannitol, sorbitol, etc.) are used. As mentioned above, the water-soluble polymers have an effect of preventing the cornification of cellulose, nevertheless some of the water-soluble polymers are inferior in water-conveying property into inner part of the dry composition. Accordingly, it is sometimes necessary to apply a stronger mechanical shearing force for a longer period of time in order to disperse the dry composition in water. On the other hand, the hydrophilic substance mainly enhances the water-conveying property, and concretely, accelerates the water-disintegrating property of the dry composition. Since dextrin works especially well in achieving this effects, the use of dextrin is preferred.

The dextrins used in the present invention are partial hydrolyzates formed by hydrolyzing starch by an acid, an enzyme or heat, in which the glucose residues are combined through $\alpha$-1,4 linkage and $\alpha$-1,6 linkage. As expressed in terms of DE (dextrose equivalent), those having an DE value of about 2-42 are used in the present invention. Branched dextrin from which glucose and low molecular weight oligosaccharide have been removed can also be used.

Into the water-dispersible dry composition of the present invention, ingredients suitable for food products, such as a starch, an oil and a fat, a protein, a salt such as an edible salt and various phosphoric acid salts, an emulsifier, a souring agent, a sweetening agent, a spice, a food color, and the like may be blended optionally, in addition to the water-dispersible cellulose, water-soluble polymer and hydrophilic substance, for the purpose of improving suspension stability, flavor, appearance, and etc. The total amount of the individual ingredients is at most 85% by weight, and is determined in view of productivity, its function, its price, etc.

As mentioned above, when the water-dispersible dry composition is thrown into water and a mechanical shearing force is applied thereto, the constitutional units (such as the particles) are disintegrated and the fine-fibrous cellulose is dispersed in water. Therein, the mechanical shearing force is applied by dispersing a 0.5% by weight aqueous dispersion with a rotational homogenizer at 15,000 rpm or less for 15 minutes at temperature of 80° C. or lower The aqueous dispersion thus obtained contains the "component stably suspensible in water" in an amount of 30% by weight or more based on the total cellulose component. This aqueous dispersion shows a loss tangent smaller than 1, at a concentration of 0.5% by weight. The method for measuring the content of the "component stably suspensible in water" in a water-dispersible cellulose and the loss tangent will be mentioned later. As mentioned above, the "component stably suspensible in water" in a water-dispersible cellulose has a major axis of 0.5-30 µm and a minor axis of 2-600 nm. The major axis/minor axis ratio is 20-400. Preferably, the width thereof is 100 nm or less, and more preferably 50 nm or less.

Next, the methods for producing the water-dispersible cellulose, the aqueous suspension-form composition and the water-dispersible dry composition of the present invention will be described below.

As mentioned above, a raw material for the water-dispersible cellulose of the present invention is cellulosic substance originating from plant cell wall. Herein, the general properties thereof will be explained. For producing the water-dispersible cellulose of the present invention efficiently, it is preferable to use a cellulosic substance having an average degree of polymerization of 400 or higher and an $\alpha$-cellulose content of 60-100% by weight. However, even if the properties satisfy the above-mentioned conditions, those having an average degree of polymerization lower than 1,300 and an $\alpha$-cellulose content over 90% by weight at the same time are excepted. More preferably raw materials have an $\alpha$-cellulose content of 85% by weight or less, and most preferably 75% by weight or less. Especially preferable raw materials include wood pulp, cotton linter pulp, wheat straw pulp and bamboo pulp. When the average degree of polymerization of a raw material is lower than 1,300 and the content of $\alpha$-cellulose exceeds 90% by weight, it is quite difficult to make the cellulose have a loss tangent smaller than 1, when made into a 0.5% by weight aqueous dispersion (a method for measuring an average degree of polymerization and an $\alpha$-cellulose content will be described hereinbelow).

The important point in the method for producing a water-dispersible cellulose of the present invention lies in, to express briefly, extracting the cellulose microfibril contained in the raw material in the form, as micronized as possible, without fiber-shortening. As used herein the term "fiber-shortening" means to make the fiber length of cellulose microfibril short by the action of cutting, or the like, or the state itself where the fiber has been shortened. The term "micronization" means to make the fiber diameter of cellulose microfibril thinner by the action of, for example, tearing, or the state itself where the fiber diameter has been made thinner. According to the technique of the present day, the "micronization" process is more or less accompanied by a "fiber-shortening" process, as there is no apparatus available that can only produce "micronization" by providing only a tearing action.

Particularly when the starting cellulosic substance has a low average degree of polymerization, "fiber-shortening" tends to occur. When the micronizing treatment is carried out until no coarse fiber is found, the fiber-shortening action simultaneously progresses. As a result, 0.5% by weight aqueous solution of the resulting fibrous cellulose comes to show a loss tangent of 1 or higher.

Further the $\alpha$-cellulose content of the starting cellulosic substance also influences the value of the loss tangent. That is, when the content of $\alpha$-cellulose is high, the "micronization" and the "fiber-shortening" simultaneously progress, so that the loss tangent, when made into a 0.5% by weight aqueous solution, is apt to be greater than 1, which is not desirable. By the way, $\alpha$-cellulose is insoluble in a 17.5% by weight aqueous solution of NaOH and is considered to have a relatively high degree of polymerization and a high crystallinity. As the content of components other than $\alpha$-cellulose contained in the starting cellulosic material, namely $\beta$-cellulose, $\gamma$-cellulose, hemicellulose and the like increases, "micronization" tends to progress preferentially to "fiber-shortening". Accordingly, when the content of the components other than $\alpha$-cellulose increases, the loss tangent of the aqueous dispersion tends to become less than 1. Probably, this is presumably attributed to the fact that the $\alpha$-cellulose component constitutes the highly crystalline microfibril component, while the other components are localized around the microfibril.

In the present invention, in order to make the "micronization" progress while suppressing the "fiber-shortening", a starting cellulosic material having a higher value of average degree of polymerization and a lower content of $\alpha$-cellulose is preferably used. However, the $\alpha$-cellulose component is generally high in its degree of polymerization, and thus when the α-cellulose content is low, the average degree of polymerization tends to simultaneously be lower. Therefore, a detailed study is necessary to determine the optimum balance between them.

As a result of the study, it has been found that "micronization" progresses in preference to "fiber-shortening" when the α-cellulose content is 60-90% by weight, providing that the average degree of polymerization of the starting cellulosic substance is 400 or higher but lower than 1,300, and when the α-cellulose content is 60-100% by weight, providing that the average degree of polymerization of the starting cellulosic substance is 1,300 or higher. In this respect, a case where the content of α-cellulose is lower than 60% by weight is not suitable because the amount of the component capable of becoming the micro-fibrillated cellulose decreases relatively.

The starting material used in the present invention may be used after being subjected to a pre-treatment for the purpose of promoting the micronization. As the method of the pre-treatment, for example, immersion in a dilute aqueous alkali solution (for example, 1 mol/L aqueous NaOH solution) for several hours, immersion in a dilute aqueous acid solution, an enzymatic treatment, breaking with explosion, etc., can be included.

An example of the process for producing the water-dispersible cellulose of the present invention will be mentioned.

(1) Preparation of an Aqueous Dispersion of Cellulose Fibrous Particles

First, the starting cellulosic substance used in the present invention is pulverized into fibrous particles having a length of 4 mm or less. Preferably, 50% or more of the total fibrous particles has a length of about 0.5 mm or more. More preferably, all the particles have a length of 3 mm or less, and most preferably all the particles have a length of 2.5 mm or less. The method of pulverization may be either a dry process or a wet process. In the case of the dry process, a shredder, a hammer mill, a pin mill, a ball mill, etc., can be used, while in the case of the wet process, a high speed rotational homogenizer, a cutter mill, etc. can be used. If necessary, the treatment is carried out after processing the starting cellulosic material to have a size facilitating the feeding into each machine. The pulverizing treatment may be repeated a plurality of times. The use of a strong pulverizing machine, such as a wet medium-agitation type pulverizer, is undesirable because it produces an excessively shortened fiber.

A preferable machine is a wet type Comitrol (URSCHEL LABORATORIES, Inc.). When Comitrol is used, the starting pulp is cut into a size of 5-15 mm square, hydrated to a water content of about 72-85%, and then the material is thrown into an apparatus equipped with a cutting head or a micro-cut head to carry out the treatment.

Then, the fibrous particle thus obtained is thrown into water, and dispersed without coagulation by means of propeller-agitation, rotational homogenizer, or the like. In the case where the starting materials have short fiber particle length as a result of pulp-making process, etc., it is sometimes possible to prepare an aqueous dispersion of fibrous particles having a length of 4 mm or less only by this dispersing operation, without the above-mentioned pulverization using a mill. In this dispersing operation, the concentration of cellulose in the dispersion is preferably about 0.1 to 5% by weight. At the same time, a water-soluble polymer and/or a hydrophilic substance may be added for the purposes of stabilizing the suspension of the fibrous particle or preventing the coagulation thereof. Blending of sodium carboxymethyl cellulose is one of the preferable embodiments.

(2) Fiber-Shortening and Micronization of Cellulose Fibrous Particles

The cellulose fibrous particles present in the aqueous dispersion obtained in (1) are subjected to a fiber-shortening treatment and micronization, to some extent so as to make the sedimentation volume 70% by volume or more, and preferably 85% by volume or more. As used herein, the term "sedimentation volume" means the volume of a clouded suspension layer observed when dispersing fine cellulose fibrous particles in water to obtain a uniform aqueous dispersion having a cellulose content of 0.5% by weight, pouring 100 mL of the dispersion into a glass tube with an inner diameter of 25 mm, agitating the content by turning the tube upside-down several times, and then allowing the tube to stand at an ambient temperature for 4 hours.

The above-mentioned fiber-shortening and micronization can be carried out by treating the aqueous dispersion obtained in (1) with an apparatus, such as a high speed rotational homogenizer, a piston type homogenizer, a whetstone-rotation type pulverizer or the like. A preferable apparatus is the whetstone rotation type pulverizer, which is a sort of the colloid mill or the stone mortar type pulverizer. For example, this is an apparatus in which whetstones composed of No. 16-120 whetstone particles are ground together, and the above-mentioned aqueous dispersion is passed through the ground parts to enable the pulverizing treatment. If necessary, this treatment may be repeated a plurality of times. In this case, changing whetstone to the ones having suitable sizes of whetstone particles is one of the preferred embodiment. For example, a whetstone rotation type pulverizer contributes to both "fiber-shortening" and "micronization", and the proportions of the contribution can be controlled by selecting the grain size of the whetstone particles. Thus, when the fiber-shortening is of interest, whetstones of No. 46 or under are useful, whereas when the micronization is of interest whetstones of No. 46 or above are effective. No. 46 whetstone exhibits both of the actions. Concrete apparatuses include Pure Fine Mill (Grinder Mill) (Kurita Kikai Seisakusho, Co., Ltd.), and Cerendipitor, Supermasscolloidor, Supergrindell (all manufactured by Masukou Sangyo, Co., Ltd.), etc.

(3) High Pressure Homogenizer Treatment

An aqueous dispersion containing the fibrous cellulose particles which have been shortened and micronized in (2) is treated with a high pressure homogenizer at a pressure of 60-414 MPa to prepare a water-dispersible cellulose and an aqueous suspension-form composition. The treatment is repeated a plurality of times, if necessary. It is also possible to separate a finer cellulose component by centrifugation or the like.

When the average degree of polymerization of the fibrous cellulose particle is 2,000 or higher and the content of α-cellulose exceeds 90% by weight, it is sometimes necessary to repeat the high pressure homogenizer treatment more than 10-20 times. Considering production efficiency, however, it is desirable to suppress the number of the treatments to 6 times or less by appropriately selecting the starting material and the treating conditions of whetstone rotation type pulverizer in step (2).

Generally, when the number of the treatments is increased, viscosity increases at first but thereafter decreases gradually. Probably, this is attributable to the fact that, the "micronization" reaches its upper limit more rapidly than fiber-shortening as the number of the treatments increases. After the viscosity of the system has risen until the limit of micronization has been reached, substantially only the "fiber-shortening"

progresses with the increase in the number of the treatments, to lower the viscosity of the system.

The micronization tends to progress more preferentially at a lower concentration of cellulose particles. As a result, the highest attainable value of apparent viscosity becomes higher and the loss tangent becomes lower. A lower treating pressure similarly tends to give a higher maximum attainable viscosity and a lower loss tangent. It, however, necessiates an increase of the number of times of treatment, which results in a drop in productivity. In this case, the maximum attainable viscosity is difficult to reach when the content of α-cellulose is high. Contrarily, when the treating pressure is high, the maximum attainable viscosity can be reached after fewer treatments, but under such a condition the "fiber-shortening" readily progresses and the absolute value of viscosity becomes much lower.

Based on the above-mentioned findings, the lower limit of the treating pressure in the homogenizer in the present invention is 60 MPa, and its upper limit is 414 MPa. When the pressure is lower than 60 MPa, the "micronization" cannot progress sufficiently, and the water-dispersible cellulose of the present invention cannot be produced. At the present time, none of the apparatuses is found to produce a pressure exceeding 414 MPa. The pressure is preferably 70-250 MPa, and more preferably 80-150 MPa.

The cellulose particle concentration in the aqueous dispersion to be treated is preferably about 0.1-5% by weight and further preferably 0.3-3% by weight.

The temperature of treatment may be appropriately selected from a range of about 5-95° C. Although the micronization progresses more readily at a higher treating temperature, the fiber shorten to a marked extent, depending on the kind of starting materials. For example, in the case of wood pulp, micronization progresses and the viscosity readily increases at 75° C. or higher, while in the cases of wheat straw pulp and bagasse pulp, the viscosity tends to become low so that the treatment is preferably carried out at 25-60° C.

Concretely, the apparatuses include: a pressure type homogenizer (Invensys APV Co., Izumi Food Machinery K.K., Sanwa Kikai K. K.), Emulsiflex (AVESTIN Inc.), Ultimizer System (Sugino Machine, Co., Ltd.), Nanomizer System (Nanomizer K. K.), Microfluidizer (MFIC Corp.), etc.

(4) Blending of Water Soluble Polymer and/or Hydrophilic Substance

To the aqueous dispersion treated according to (3), a water-soluble polymer and/or a hydrophilic substance may be added, if desired. The water-soluble polymer and/or hydrophilic substance may be added after making them into an aqueous solution or in the form of powder as they are. When they are added in the form of powder, coagulation tends to occur and particularly when the solid concentration is high, the addition of powder deteriorates fluidity, in which, therefore, a suitable agitator or a mixer is used appropriately.

(5) Drying

In producing the water-dispersible dry composition of the present invention, the aqueous dispersion obtained in (4) is dried by a known method. A method which does not produce hard lumps of the dried material is advisable. For example, a freeze-drying method, a spray drying method, a tray drying method, a drum drying method, a belt drying method, a fluidized bed drying method, a microwave drying method, a heat-generating fan type vacuum drying method, etc. are preferable. If the drying is carried out at high temperature for a long period of time, the water-dispersibility is deteriorated. This is probably due to a marked progress of the cornification of the cellulose particles (fibers). From the viewpoint of water-dispersibility, the drying temperature is preferably 120° C. or lower and especially 110° C. or lower. The water content after the drying is preferably 15% by weight or less, further preferably 10% by weight or less, and most preferably 6% by weight or less, from the viewpoint of handling property and time-stability. If the water content is less than 2% by weight, the product can be charged with static electricity, causing the powder to become difficult to handle.

The dried product is pulverized according to the need. As the pulverizer, a cutter mill, a hammer mill, a pin mill, a jet mill and the like are used, and pulverization is carried out until the powder comes to pass thoroughly through a sieve having a mesh size of 2 mm. More preferably, the pulverization is carried out until the pulverized product comes to pass nearly wholly through a sieve having a mesh size of 425 µm and, as an average, the particle size reaches 10-250 µm. In this manner, the water-dispersible dry composition can be produced.

The gel-forming composition, which is another embodiment of the present invention, can be obtained by mixing the water-dispersible dry composition with at least one polysaccharide powder selected from alginic acids, galactomannan and glucomannan. These powders are mixed according to a known method, namely by the use of a vessel-rotation type mixer (cylinder type, V type, double conical type, etc.), a vessel-fixation type mixer (ribbon type, screw type, paddle type, planet-wise movement type, high speed flow type, rotating disk type, etc.), a fluidized mixer, an air stream agitation type mixer, etc. The mixing is carried out, roughly saying, at a proportion of 10-90% by weight of the water-dispersible dry composition and 90-10% by weight of the polysaccharide.

The water-dispersible cellulose, aqueous suspension-form composition, water-dispersible dry composition and gel-forming composition of the present invention obtained according to the above-mentioned methods contain cellulose, which is a water-insoluble substance, as a main component. Since the cellulose is in the form of a very fine fiber, however, it does not impart any rough mouth feel or powdery feel to a food product, when blended into the food product. Further, they are excellent in the performances of thickening, shape-retention, suspension stabilization, emulsion stabilization, heat stabilization (heat-resistant shape-retention, denaturation-prevention of proteins), and performance of imparting a body feel. These performances are useful not only in the field of food products but also in pharmaceuticals, cosmetics, and industrial uses.

Examples of the food composition into which the water-dispersible cellulose, aqueous suspension-form composition, water-dispersible dry composition and gel-forming composition of the present invention can be blended include but are not limited to, the following:

luxury drinks, such as coffee, black tea, powdered green tea, cocoa, adzuki-bean soup, juice, soya-bean juice, etc.;

milk component-containing drinks, such as raw milk, processed milk, lactic acid beverages, etc.;

a variety of drinks including nutrition-enriched drinks, such as calcium-fortified drinks and the like and dietary fiber-containing drinks, etc.;

dairy products, such as butter, cheese, yogurt, coffee whitener, whipping cream, custard cream, custard pudding, etc.;

iced products such as ice cream, soft cream, lacto-ice, ice milk, sherbet, frozen yogurt, etc.;

processed fat food products, such as mayonnaise, margarine, spread, shortening, etc.;

soups;

stews;

seasonings such as sauce, TARE, (seasoning sauce), dressings, etc.;

a variety of paste condiments represented by kneaded mustard;

a variety of fillings typified by jam and flour paste;

a variety or gel or paste-like food products including red bean-jam, jelly, and foods for swallowing impaired people;

food products containing cereals as the main component, such as bread, noodles, pasta, pizza pie, corn flake, etc.;

Japanese and European cakes, such as candy, cookie, biscuit, hot cake, chocolate, rice cake, etc.;

kneaded marine products represented by a boiled fish cake, a fish cake, etc.;

live-stock products represented by ham, sausage, hamburg steak, etc.;

daily dishes such as cream croquette, paste for Chinese foods, gratin, dumpling, etc.;

foods of delicate flavor, such as salted fish guts, a vegetable pickled in sake lee, etc.;

liquid diets such as tube feeding liquid food, etc.;

supplements; and pet foods, etc.

These food products are all encompassed within the present invention, regardless of any difference in their forms and processing operation at the time of preparation, as seen in retort foods, frozen foods, microwave foods, etc.

At present, the main cellulose products compounded into food are microcrystalline cellulose (complex). When agitated in water, a microcrystalline cellulose complex generates fine particles of colloidal crystalline cellulose, and it is usually compounded into foods in this form. The colloidal microcrystalline cellulose particles exhibit their functions, such as suspension stabilizing effect and emulsion stabilizing effect, through particle-particle repulsion derived from the negative charge on the particle surface and the three-dimensional network structure originated from the rod-like form of the particles. However, since its constitutional unit is a particle, the charge on the particle surface is neutralized to lower the suspension stability at a low pH value. In addition, formation of the network structure requires a certain amount of the cellulose.

Contrariwise, the water-dispersible cellulose of the present invention has a very fine fibrous shape, unlike the colloidal microcrystalline cellulose particle. It exists in water in a relatively straight form without bending or rounding. Thus, it has a large exclusion volume. This steric hindrance is considered to be a cause of the functions, such as thickening, shape-retention, suspension stabilization, emulsion stabilization, heat stabilization, etc. Therefore, these functions are exhibited with an extremely low amount of the cellulose, and viscosity and suspension stability are not significantly affected even in an environment of low pH value or high ionic concentration. Although the amount of the water-dispersible cellulose (or aqueous suspension-form composition or water-dispersible dry composition) to be compounded into food composition varies with the purpose of the compounding, it is, for example, about 1-5% by weight in the case of low calorie paste, about 0.05-2% by weight in fat spread, 0.01-1% by weight in ices, about 0.1-0.5% by weight in mayonnaise type dressing, about 0.1-0.5% by weight in sauce or liquid dressing, and about 0.0005-0.1% by weight in drinks.

When compounded into a food composition, the water-dispersible cellulose of the present invention may be compounded together with other powdery materials and processed according to known methods. In a more preferable method, the product of the present invention is formed into an aqueous dispersion having a concentration of about 0.25-2% by weight either singly or in combination with other ingredients, and thereafter compounded into a food composition. In a further preferable embodiment, the dispersion into water is carried out at a temperature of 60-80° C. by the use of a high speed rotational homogenizer, a piston type homogenizer or a cutter mixer.

Into drinks such as coffee and tea, milk components such as milk, cream, total fat powder milk, skim milk powder, or the like are often compounded for the purpose of giving a soft taste, enriching the nutrients and giving a milky taste. Sometimes, however, emulsification of the milk components (fat globules) deteriorates due to a long-term storage or heating, and the fat components float on the upper surface of the drink and therein gather in a ring at the point of contact between the drink and a container. If such a phenomenon progresses, the whole upper surface is covered by a white film. Though such a film is temporarily broken by shaking the drink, the thin film is immediately reform when the drink is allowed to stand. In an extreme case, fat is deposited on the inner wall of container to form a ring, or the ring is broken and mixed into the drink. Such a drink no longer has any commercial value, and results in claims by the user. This is a problem called "oil-off" or "oil ring". Further, if the emulsion is broken, the milk protein is coagulated and sometimes precipitates to the bottom of the container. This similarly degrades the appearance and taste. In recent years, not only cans but also transparent containers, such as bottles and PET bottles, are largely used. In addition, even hot drinks are now sold in the PET bottles. Thus the development of an effective technique for stabilization is desired.

When compounded into a milk component containing drink, the product of the present invention effectively solves the problems mentioned above. As referred to in the present invention, the term "milk component" means liquid milk (raw milk, cow milk, etc.), powdered milk (whole powdered milk, skim milk powder, etc.), condensed milk (sugarless condensed milk, sugar-added condensed milk, etc.), cream (cream, whipping cream, etc.), yogurt, and the like. The content of the milk component in the drink is about 0.1-12% as defatted milk solid component, and about 0.01-6% as milk fat component. The amount of compounding is appropriately selected in accordance with the drink of interest (for example, milk drink, milk-containing refreshing drink, etc.).

As used in the present invention, the term "milk component-containing drink" concretely means processed milk, fermented milk drink, soured milk drink, milk-containing teas (black tea, powdery green tea, green tea, barley water, Oolong tea, etc.), milk-containing juices (fruit juice-containing drinks, vegetable juice-containing drinks, etc), milk-containing coffee, milk-containing cocoa, nutrients-balanced drink, liquid foods, etc. As raw materials thereof, a water-dispersible cellulose (or aqueous suspension-form composition or water-dispersible dry composition), a milk component, main components of the drink and water and, in addition, sweetening agent, flavour, food color, souring agent, spice, and emulsifier (glycerin fatty acid ester-monoglyceride, glycerin fatty acid ester organic acid monoglyceride, polyglycerin fatty acid ester, polyglycerin condensed ricinoleic acid ester, sorbitan fatty acid ester, propylene glycol fatty acid ester, sucrose fatty acid ester, lecithin, resolecithin, calcium stearoyllactic acid, etc.) can be referred to. The fatty acid constituting the fatty acid ester is a saturated or unsaturated fatty acid having 6-22 carbon atoms, such as caprylic acid, capric acid, lauric acid, myristic acid, palmitic acid, stearic acid, arachidic acid, behenic acid, oleic acid, linoleic acid, linolenic acid, arachidonic acid, erucic acid and the like. The organic acid constituting the organic acid monoglyceride are acetic acid, lactic acid, citric acid, succinic acid, diacetyltartaric acid and the like). Further, casein sodium; thickening stabilizer (κ-carrageenan, ι-carrageenan, λ-carrageenan, sodium carboxymethyl cellulose, propylene glycol alginate, Locust bean gum, guar gum, tara gum, pectin etc.), microcrystalline cellulose, dietary fiber (indigestible dextrin, polydextrose, enzymatically hydrolyzed guar gum, water-soluble soybean polysaccharide, etc.), nutrient intensifier (vitamins, calcium, etc.), flavoring material (coffee powder, milk flavor, brandy, etc.), food material (sarcocarp, fruit juice, vegetables, vegetable juice, starch, cereals, soybean juice, honey, plant oils and fats, animal fats and oils, etc.), and condiments (miso, soy sauce, edible salt, sodium glutamate, etc.) may be compounded.

A milk component-containing drink is produced according to known methods. For example, a powdery starting material (sugar, skim milk powder, etc.) is added to hot water and agitated and dissolved (dispersed). Then, a liquid starting material such as coffee extract, fruit juice, cream and the like, is added and homogenized, and poured into a container to obtain a product. Sterilization is carried out by appropriately selecting a method of HTST (High Temperature Short Time) sterilization, hot pack sterilization, retort sterilization, etc., in accordance with the form of article (can, bottle, PET bottle, paper pack, cup, etc.), desired storage conditions (chilled, ambient temperature, elevated temperature, etc.) and desired storage period. Preferably, the drink of the present invention is subjected to a homogenizing treatment at least once, after compounding all the ingredients including the water-dispersible cellulose or aqueous suspension-form composition or water-dispersible dry composition, whereby the milk component can be highly stabilized.

The water-dispersible dry composition may be compounded together with the powdery starting material. However, the water-dispersible dry composition can exhibit its effect only when it exists in a drink in the form of dispersed fine-fibrous cellulose, and therefore it is desirable to agitate it with a powerful agitator, such as a high speed rotational homogenizer, etc. Otherwise, it is also permissible to agitate a water-dispersible dry composition together with water or hot water to prepare a dispersion, before compounding. To adjust the temperature to 60-80° C. and to use a piston type high pressure homogenizer (10 MPa or above) upon preparing the dispersion is one of the preferable embodiments.

The water-dispersible cellulose (or aqueous suspension-form composition or water-dispersible dry composition) is compounded into a milk component-containing drink in an amount of about 0.001-0.5% (solid), preferably 0.005-0.2%, and more preferably 0.007-0.1%. If its amount is too small, the oil-off preventing effect cannot be exhibited sufficiently. If its amount is too large, the viscosity of the system becomes too high, and the natural mouth feel (throat-passing feel) of the drink is adversely affected reducing its commercial value. Although the detailed mechanism of the oil-off phenomenon is unknown, it is probably due to the fact that the fat globules from the milk component collide with each other due to the thermal vibration to break the emulsion state, resulting in floating of the fat component and the precipitation of protein. It is thought that, when the product of the present invention is used, the fine-fibrous cellulose forms a network throughout the whole drink, and the network produces steric hindrance which prevents collisions among the fat globules and prevents the destruction of the emulsion. There is also a possibility that, since cellulose tends to have a weak interaction with the milk components (fat globule), the fat globules are bound to the neighborhood of the fine-fibrous cellulose and, thus, the thermal vibration of fat globules is suppressed.

In the case of a milk coffee drink, the desirable amount of compounding is about 0.008-0.08%. In the case of prior cellulosic additives, such as microcrystalline cellulose, the oil-off can be suppressed by combined use with glycerin fatty acid ester. However, if the product is stored at a high temperature of about 60° C., the milk component and the microcrystalline cellulose interact with each other in some cases to cause a coagulation. Contrariwise, in the case of the drinks of the present invention, a uniform appearance can be retained without oil-off and oil-ring and further without precipitation of protein and coagulation or separation of the system, under conditions of chilled storage (5° C.), ambient temperature storage (25° C.) and even hot storage (60° C.), even if the amount of the product of the present invention is as small as 0.08% or less. Needless to say, it is permissible to compound the product of the present invention with other substances, the effect of which has been recognized, such as an emulsifier, carrageenan, casein sodium, sodium carboxymethyl cellulose, microcrystalline cellulose, etc. In this manner, it becomes possible to sell, for example, a milk coffee in PET bottles stored hot, without change in appearance, such as oil-off.

It has been known that a high concentration aqueous dispersion of microcrystalline cellulose or fine-fibrous cellulose can form a gel. This type of gel is called a "weak gel". When a slight stress is applied to this gel, it does not flow but behaves as an elastic body. When a large stress is applied thereto, however, it flows. Further, when the stress is eliminated, it exhibits the original nature of a weak gel. Although this type of gel exhibits softness and fluidity like mayonnaise, there is neither shape-retention such as jelly or pudding nor mouth fell in that.

On the other hand, when the gel-forming composition of the present invention is made into an aqueous dispersion and allowed to stand, it forms a so-called "true gel" similar to jelly and pudding. The true gel is different from the weak gel in that the true gel does not flow but is structurally broken when an excessive stress is applied thereto. When a true gel is ground, it assumes the state of a microgel which is an assembly of small gels. The microgel is a sort of weak gel.

There have hitherto been many techniques known for forming a gel by a combined use of a plurality of polysaccharides. For example, the combination of xanthane gum and Locust bean gum and the combination of carrageenan and Locust bean gum are included. As a true gel constituted of cellulose and other polysaccharides, JP-A-63-196238 discloses that a gel material can be obtained by mixing a microfibrillated cellulose with konjac taro or konjac powder to prepare a slurry and then drying the slurry or freezing and melting it. However, this gel becomes very rigid as does gummy candy when dried, and when frozen and melted, this gel undergoes a marked separation of water to give an uneven texture too strong to bite off. The gel was thus not applicable to food products.

As used in the present invention, alginic acids inclusively means alginic acid, salts thereof and propyleneglycol alginate. Since these materials have to be used in the state of being dissolved in water, pH control and salt concentration control may be necessary. Sodium alginate is especially preferable because of its water-solubility. Alginic acid is a 1,4-bonding type block copolymer consisting of β-D-mannuronic acid (abbreviated to M) and α-L-glucuronic acid (abbreviated to G). An alginic acid molecule is constituted of three segments, i.e. a block consisting of M (M-M-M-M), a block consisting of G (G-G-G-G), and a block consisting of alternative combination of both residues (M-G-M-G). On the other hand, galactomannan has in its structure a main chain consisting of β-1,4-bonded β-D mannose residues and side chains consisting of α-1,6-bonded α-D-galactose residues. There are various galactomannans, such as guar gum, tara gum, Locust bean gum, etc. which are different from one another in the proportions of mannose and galactose. Since many of the galactomannans have unique odor originated from the starting material, the use of odorless purified product is preferable. Glucomannan has a structure of β-1,4-bonded D-glucose and D-mannose, wherein the ratio of glucose to mannose is about 2:3. Konjac powder and alcohol-purified glucomannan are included, among which purified glucomannan of high degree of polymerization is preferable. Concretely saying, those having a viscosity of 30 Pa·s or above at 25° C., when made into a 1% aqueous solution, are preferable, and those having a viscosity of 40 Pa·s or above are especially preferable.

As mentioned above, a gel composition is formed when a water-dispersible dry composition and at least one polysaccharide selected from alginic acids, galactomannan and glucomannan are dispersed in water and then left to stand. However, formation of the gel composition is not limited to the case where the water-dispersible dry composition is used. The water-dispersible cellulose or the aqueous suspension-form composition can also be used. However, the highest gel strength is attained when the water-dispersible dry composition can also be used. As for the amount to be compounded, the water-dispersible dry composition (or water-dispersible cellulose or aqueous suspension-like composition) is used in an amount of 0.15% (solid) or more, and at least one polysaccharide selected from alginic acids, galactomannan and glucomannan is used in an amount of 0.03% or more. The total solid component concentration has an upper limit of about 5%. Gel strength (breaking strength) of the gel composition prepared is at most about 1N. The polysaccharide may be added in the form of a powder, or mixed with a water-dispersible dry composition (or water-dispersible cellulose or aqueous suspension-form composition) dispersed in water, after it is made into an aqueous solution (swollen solution). If the polysaccharide is used after making it into an aqueous solution (or swollen solution), the gel-strength is apt to become high. If it is mixed at a high temperature (above 30° C.), gel-formation begins immediately, and therefore a higher gel strength can be obtained by carrying out the mixing at a lower temperature (for example, about 5° C.) with a high speed agitation, in a short period of time.

If these gel-form compositions are subjected to a heat treatment, a higher gel-strength (breaking strength) can be attained. The term "heat treatment" means an operation of maintaining a state of standing at a temperature of 30° C. or above. The heat treatment may be carried out either at the time of forming the gel-form composition by leaving the mixture obtained by mixing the water-dispersible dry composition (or water-dispersible cellulose or aqueous suspension-form composition) with a polysaccharide to stand, or after the formation of gel composition.

A higher temperature of heat treatment can give a higher gel strength in a shorter period of time. When the gel-form composition is heated after it is once formed, the gel strength will markedly increase by the heating for a period of several seconds to several days at a temperature higher than that used to form the gel composition, such as 60-120° C. or at a higher temperature. The strength is maintained even if the temperature is reduced to a lower temperature. That is, it is thermally irreversible. This gel composition does not dissolve or cause separation of water even if it is re-heated, and, thus, has a very high heat stability. Accordingly, the gel composition can be warmed before being eaten. Concretely saying, the composition can maintain its gel strength of 0.01-1N at 50° C. or above. If the amount of the gel composition is reduced, it gives a very soft gel similar to the existing gels, but it is still excellent in heat stability and shows no separation of water. Accordingly, it is most suitable for use as a general desert and as a retort food such as a food for people with swallowing disorders, which food has attracted public interest in recent years. This is, from the viewpoint of diversification of meals, due to the facts that a warm meal can be offered, that the extent of water separation is small even if the gel is soft, and that the gel structure can be maintained even in the case of retort sterilization so that solid components such as chopped food or the like, if it is compounded, do not precipitate. This makes it possible to maintain the same uniform state of the food as the one before the sterilization. Since the gel composition is not dissolved or disintegrated even when thrown into hot water, the composition can be in diced form and used as an ingredient in miso soup or other soups.

As the compounded components in the gel-forming composition and gel composition, those composed of the water-dispersible cellulose and sodium carboxymethyl cellulose are most suitable. When galactomannan is used as the polysaccharide, the gel-strength is apt to become high even at low temperatures. However, attention should be paid to the fact that, if heated excessively, the galactomannan is decomposed and the gel strength becomes low. Since glucomannan is high in heat stability, its gel strength scarcely decrease even if heated after formation of the gel composition. Since high-viscosity type glucomannan, it is preferable to use glucomannan by previously making it into a swollen solution. Although there are respective optimum compounding ratios between the water-dispersible dry composition (or water-dispersible cellulose or aqueous suspension-form composition) and polysaccharide, the optimum ratio is about 5-40% by weight as expressed in terms of proportion of polysaccharide. For example, in the case of Locust bean gum, the proportion is about 50% by weight, in the case of tara gum, it is about 10% by weight, and in the case of glucomannan, it is about 30% by weight.

As used herein, the term "gel composition having a sponge-like structure" (hereinafter, referred to as "sponge-like gel") means a gel having a sponge-like texture. The pores therein have a minor axis (d) and a major axis (l) of about 1-1,000 μm, and d/l of about 1-10, with a polygonal shape, such as triangle, square, trapezoid, rhomb, pentagon, hexagon, etc. The shape of the pores can be observed with a gel cut into a thin section by a sharp knife, by observing it under an optical microscope with transmitting light or polarized light, in the presence of a sufficient quantity of water. It is also possible to observe the shape of the pores by SEM after freeze-drying. In the partition walls defining the pores, the water-dispersible cellulose and glucomannan form a gel, and the water content therein is about 5-50%. The quantity of water retained in the pores is about 90-95%.

The sponge-like gel of the present invention includes a water-dispersible dry composition (or water-dispersible cellulose or aqueous suspension-form composition), glucomannan and water. The approximate composition (solid) is a water-dispersible dry composition (or water-dispersible cellulose or aqueous suspension-form composition): glucomannan=85:15 to 35:65 (solid), and preferably 80:20 to 37:63 and particularly preferably 75:25 to 40:60. When the composition ratio is in the above-mentioned range, a higher breaking strength is exhibited. The total solid concentration in the gel is about 0.1-5%, and particularly preferably 0.5-1.5%. If the solid concentration is low, the gel strength (breaking strength) becomes low. When the concentration is too high the viscosity of the system becomes too high and agitation and mixing become difficult to carry out.

The sponge-like gel of the present invention is edible, and usable in food products. It has a hardness which is low enough for a healthy person to bite off and chew. The gel strength (breaking strength) thereof is about 0.1-5N. Similar to a sponge used for washing tableware, the sponge-like gel of the present invention releases water with shrinkage of its volume, when pushed with spoon or the like. When a sufficient amount of water is added thereto, the sponge absorbs the water and swells until it recovers the original shape. This operation can be repeated and, thus, absorption and separation of water can be practiced reversibly. Even so, as mentioned above, the sponge-like gel has a hardness sufficiently low that one can bite off and chew it. It has a crunchy or crispy texture, which comes from the sponge texture. The mouth feel exhibited by this gel when eaten, namely the juicy feel brought about by the water exuding from the whole gel and the crunchy mouth feel upon biting it off, is a novel mouth feel different from that of the existing gels, such as agar, carrageenan/Locust bean gum gel, nata-de-coco, konjac, etc.

For preparing the sponge-like gel of the present invention, it is first necessary to bring the water-dispersible dry composition (or water-dispersible cellulose or aqueous suspension-form composition) into a state where fine-fibrous cellulose is uniformly dispersed in water. For this purpose, it is desirable to make a dispersion with a powerful apparatus, such as a high speed rotational homogenizer, a piston type high pressure homogenizer or the like. More preferably, the temperature at the time of making the dispersion is 60° C. or higher. For dissolving (swelling) a high viscosity type glucomannan in water, a known method may be used. For example, glucomannan may be added to water at room temperature and stirred, after which the mixture is allowed to stand for 7 hours or more. The water-dispersed mixture may be prepared by first dispersing a water-dispersible dry composition (or water-dispersible cellulose or aqueous suspension-form composition) in water and then adding glucomannan powder and thoroughly agitating the mixture, or by adding aqueous solution of glucomannan and then stirring and mixing the resulting mixture. Examples of the high speed rotational homogenizer include TK Homomixer manufactured by Tokushu Kika Kogyo, Co., Ltd., Excel Autohomogenizer manufactured by Nippon Seiki, Co., Ltd. and the like.

Subsequently, this water-dispersed mixed solution is frozen. This step may be carried out by agitating and mixing the solution, allowing it to stand to form a gel composition and thereafter freezing the resulting composition, or by immediately freezing the prepared mixture. A higher gel strength (breaking strength) of the sponge-like gel can be attained by once forming a gel composition with high gel strength (breaking strength) by a heat treatment or the like and thereafter carrying out the freezing.

The freezing is carried out by introducing a water-dispersed mixed solution into a container and cooling it to a temperature lower than the freezing point. The methods include a method of dipping in a cooling medium such as brine or the like; a method of standing in a low temperature atmosphere, such as in a refrigerator, a method of cooling to a temperature lower than freezing point under an elevated pressure and thereafter reducing the pressure to atmospheric pressure to promote freezing, etc. One of these methods may be selected appropriately. The freezing temperature (freeing velocity) drastically influences the formation of the sponge-like texture. For example, when freezing is slowly carried out at a relatively high temperature not lower than −20° C., large pores and thick partition walls are formed and the resulting mouth feel tends to become highly crunchy. On the other hand, when the freezing is carried out rapidly at a relatively low temperature of −45° C. or lower, small pores are formed and the resulting mouth feel tends to become soft and smooth. This is probably attributable to the fact that the pores in the sponge-like structure are dependent on the growth of ice crystals. The de-freezing is carried out by allowing the frozen product to stand at a temperature exceeding 0° C. For example, the thawing temperature may be room temperature or a higher temperature Into the sponge-like gel of the present invention, other food materials, such as starches, oils and fats, proteins, salts and the like and seasoning, sweetening agents, food colors, spices, souring agents, emulsifiers, thickening stabilizers, dietary fibers, nutrient intensifiers (vitamins, calcium, etc.) and flavor materials may be compounded, for the purpose of improving flavor and appearance, so long as addition of these materials does not adversely affect gel formability.

The sponge-like gel of the present invention is suitably usable in the ingredients of desert, such as fruit punch, anmitsu (boiled peas with honey and bean jam), jelly and the like. In this case, for example, a sponge-like gel is formed from a water-dispersible dry composition (or water-dispersible cellulose or aqueous suspension-form composition), glucomannan and water and thereafter the gel is dipped in syrup and mixed into a desert.

Further, the gel of the present invention is suitable for use in accentuation of drinks, soups, fillings, etc. The property of the product of the present invention of reversibly absorbing and releasing water, may be useful in the fields of pharmaceuticals, cosmetics, and industrial products, too.

EXAMPLES

Hereinbelow, the present invention will be described in further details by way of the examples. The measurements mentioned in the examples were carried out in the following manner.

<Average Degree of Polymerization of Cellulosic Substance>

The average degree of polymerization of cellulosic substance is determined according to ASTM Designation: D 1795-90 "Standard Test Method for Intrinsic Viscosity of Cellulose".

<α-Cellulose Content of Cellulosic Substance>

This determination is carried out according to JIS P8101-1976 "Method for Testing Dissolved Pulp" 5.5 α-Cellulose.

<Shape (Major Axis, Minor Axis, Major Axis/Minor Axis Ratio) of Cellulose Fiber (Particle)>

Since the sizes of cellulose fiber (particle) vary in a wide range, it is impossible to observe all the cases with only one kind of microscope. Accordingly, an optical microscope and a scanning microscope (medium resolution SEM and high resolution SEM) are appropriately selected according to the size of fiber (particle) to carry out observation and measurement.

When an optical microscope is used, an aqueous dispersion of cellulose fiber (particle) adjusted to an appropriate concentration is put on a slide glass, covered with a cover glass, and observed.

When a medium resolution SEM (JSM-5510LV, manufactured by JEOL Ltd.) is used, an aqueous sample solution is put on a sample stand and air dried, after which about 3 nm of Pt—Pd is vapor-deposited thereon and the sample is then observed.

When a high resolution SEM (S-5000, manufactured by Hitachi Science Systems, Co., Ltd.) is used, a sample aqueous dispersion is put on a sample stand and air-dried, and then about 1.5 nm of Pt—Pd is vapor-deposited and the sample is then observed.

A major axis, a minor axis and a major axis/minor axis ratio of a cellulose fiber (particle) was measured on 15 or more particles selected from the photographs. In the examples mentioned below, the shapes of the fibers ranged from nearly straight ones to curved ones (like hair), but none of them was in curled form like waste yarn. The minor axis (thickness) varied in a wide range within one thread of fiber, and thus an average value was taken. The high resolution SEM was used for observation of fibers having a minor axis of about several nm to 200 nm, but one thread of fiber was too long and could not be observed in a single visual field. Thus, photographing was repeated while moving the visual field, after which the photographs were combined and analyzed.

<Loss Tangent> (=Loss Elastic Modulus/Storage Elastic Modulus)

(1) A sample and water were weighed out so as to give an aqueous dispersion having a solid concentration of 0.5% by weight, and dispersed with Ace Homogenizer (manufactured by Nippon Seiki, Co., Ltd., model AM-T) at 15,000 rpm for 15 minutes.

(2) The dispersion was left standing in an atmosphere of 25° C. for 3 hours.

(3) The sample solution was introduced into a dynamic viscoelasticity measuring apparatus and left standing for 5 minutes, before measurement under the following conditions. From the results thereof, a loss tangent (tan δ) at a frequency of 10 rad/s was determined.

Apparatus: ARES (Model 100 FRTN1) (manufactured by Rheometric Scientific Inc.)
Geometry: Double Wall Couette
Temperature: 25° C.
Strain: 10% (fixed)
Frequency: 1 to 100 rad/s (elevated over a period of about 170 seconds)<

<0.25% Viscosity>

(1) A sample and water were weighed out so as to give an aqueous dispersion having a solids concentration of 0.25% by weight, and dispersed at 15,000 rpm for 15 minutes with Ace Homogenizer (Model AM-T, manufactured by Nippon Seiki, Co., Ltd.).

(2) The dispersion was left standing at 25° C. for 3 hours.

(3) After thorough stirring, a rotational viscometer (B type viscometer BL form, manufactured by Tokimek, Co., Ltd.) was set up. Thirty seconds after completing the stirring, rotation of the rotor was started. Thirty seconds thereafter, the indication of the viscometer was read, from which viscosity was calculated. The speed of rotation of the rotor was fixed at 60 rpm, and the rotor was altered appropriately, depending on the viscosity.

<Sedimentation Volume>

(1) A sample and water were weighed out so as to give an aqueous dispersion of 0.5% by weight, and were introduced into a glass container equipped with a lid. The contents were shaken and stirred by hand about 20 times.

(2) 100 mL of the sample solution was poured into a glass tube having an inner diameter of 25 mm, and the tube was turned upside-down several times to stir the contents, after which the tube was left to stand at ambient temperature for 4 hours.

(3) The volume of the turbid (or semi-transparent) suspension layer was visually observed, which was taken as the sedimentation volume (%).

<Content of "Component Stably Suspensible in Water" in Water-Dispersible Cellulose>

(1) A sample and water were weighed out so as to give an aqueous dispersion with a cellulose concentration of 0.1% by weight, and dispersed with Ace Homogenizer (Model AM-T, manufactured by Nippon Seiki, Co., Ltd.) at 15,000 rpm for 15 minutes.

(2) 20 g of the sample solution was introduced into a centrifugal tube and centrifuged with a centrifugal machine at 1,000 G for 5 minutes.

(3) The upper liquid layer was removed, and the weight of the sedimented component (a) was measured.

(4) Then, the sedimented component was absolutely dried, and weight of the solid component (b) was measured.

(5) According to the following formula, the content of "component stably suspensible in water" (c) was calculated:

$$c = 5{,}000 \times (k1+k2) \; [\% \text{ by weight}]$$

Provided that, when the system contained no water-soluble polymer (and/or hydrophilic substance), k1 and k2 were calculated according to the following formulae:

$$k1 = 0.02 - b$$

$$k2 = \{k1 \times (a-b)\}/(19.98 - a + b)$$

When the system contained a water-soluble polymer (and/or a hydrophilic substance), k1 and k2 were calculated according to the following formulae:

$$k1 = 0.02 - b + s2$$

$$k2 = k1 \times w2/w1$$

cellulose/water-soluble polymer(hydrophilic substance)=$f/d$[compounding ratio]

$$w1 = 19.98 - a + b - 0.02 \times d/f$$

$$w2 = a - b$$

$$s2 = 0.02 \times d \times w2/\{f \times (w1 + w2)\}$$

When the content of the "component stably dispersible in water" was very large, the weight of sedimented component became small, and therefore the accuracy of measurement would be low so far as the above-mentioned method is used. In such cases, therefore, the procedures of (3) and thereafter were carried out in the following manner.

(3') The upper liquid layer was taken out and the weight thereof (a') was measured.

(4') Then, the upper layer component was absolutely dried and the weight of solid component (b') was measured.

(5') According to the following formula, the content of the "component stably dispersible in water" (c) was calculated:

$$c = 5{,}000 \times (k1 + k2) \; (\% \text{ by weight})$$

Provided that, when the system contained no water-soluble polymer (and/or hydrophilic substance), k1 and k2 were calculated according the following formulae:

$$k1 = b'$$

$$k2 = k1 \times (19.98 - a' + b')/(a' - b')$$

When the system contained a water-soluble polymer (and/or a hydrophilic substance), k1 and k2 were calculated according to the following formulae:

$$k1 = b' - s2 \times w1/w2$$

$$k2 = k1 \times w2/w1$$

cellulose/water-soluble polymer (hydrophilic substance)= f/d(compounding ratio)

$$w1 = a' - b'$$

$$w2 = 19.98 - a' + b' - 0.02 \times d/f$$

$$s2 = 0.02 \times d \times w2 / \{f \times (w1 + w2)\}$$

When, in the operation of (3), the boundary between the upper liquid layer and the sedimented component was not clear and the separation was difficult, the operation was carried out at an appropriately lowered concentration of cellulose.

Example 1

Commercially available wood pulp (average degree of polymerization=1,710, α-cellulose content=93% by weight) was cut into 6×12 mm rectangles and dipped into a sufficient amount of water. Immediately hereafter, the pulp was withdrawn from the water, and the water was swished off in a sieve. At that time, water content was 74% by weight. When the wet pulp was passed once through a cutter mill ("Comitrol" Model 1700, manufactured by URSCHEL LABORATORIES, Inc., microcut head/blade distance: 2.029 mm, impeller rotation speed: 9,000 rpm), the fiber length became 0.25-3.25 mm (content of the component with fiber length of 0.5 mm or more was about 98%).

The cutter mill-treated product and water were weighed out so as to give a fiber content of 2% by weight, and the mixture was agitated until no entanglement between fibers was observed. The aqueous dispersion thus obtained was treated with a whetstone-rotation type pulverizer ("Cerendipiter" Model MKCA6-3, manufactured by Masukou Sangyo, Co., Ltd.; grinder: MKE6-46, grinder rotation speed: 1,800 rpm). The number of the treatments was four and the grinder clearance was changed to 200→60→40→40 μm, respectively. The aqueous dispersion thus obtained had a sedimentation volume of 93%.

Subsequently, the aqueous dispersion thus obtained was diluted with water to make the concentration 1% by weight, and the diluted dispersion was passed eight times through a high pressure homogenizer ("Microfluidizer" Model M-110Y, manufactured by MFIC Corp., treatment pressure: 110 MPa). Then, the dispersion was centrifuged at 35,000 G for 30 minutes, the supernatant liquid was discarded, and the sediment was dehydrated between filter papers to obtain water-dispersible cellulose A having a water content of 82% by weight. A 0.25% viscosity thereof was 70 mPa·s. Crystallinity thereof was 82%. When it was observed with a optical microscope and a medium-resolution SEM, fine fibrous cellulose having a major axis of 10-400 μm, a minor axis of 1-10 μm and a major axis/minor axis ratio of 10-300 was observed. The loss tangent was 0.21. Although it was attempted to measure the water retention thereof according to JAPAN TAPPI Paper Pulp Testing Method No. 26, the whole sample passed through a cup filter, and the value could not be determined. The content of "component stably dispersible in water" was 95% by weight. When the component was observed with a high resolution SEM, very fine fibrous cellulose having a major axis of 0.9-20 μm, a minor axis of 5-100 nm and a major axis/minor axis ratio of 30-300 was observed.

Example 2

Commercially available wheat straw pulp (average degree of polymerization=930, α-cellulose content=68% by weight) was cut into 6×12 mm rectangles. Water was added thereto so as to give a concentration of 4% by weight. The mixture was agitated with a domestic mixer for 5 minutes. When the mixture was dispersed with a high speed rotational homogenizer (ULTRA-DISPERSER, Model LK-U, manufactured by Yamato Kagaku) for one hour, the fiber length became 4 mm or less.

The aqueous dispersion thus obtained was twice treated with a whetstone-rotation type pulverizer ("Cerendipiter" Model MKCA6-3, grinder: MKE6-46, grinder rotation number: 1,800 rpm), while altering the grinder clearance as 60→40 μm, respectively. The aqueous dispersion thus obtained had a sedimentation volume of 95% by volume.

Subsequently, the aqueous dispersion thus obtained was diluted with water to a concentration of 1% by weight, and the diluted dispersion was passed through a high pressure homogenizer twenty times ("Microfluidizer" Model M-110Y, treatment pressure 110 MPa) to obtain an aqueous suspension-form composition B. Crystallinity thereof was 72%. A 0.25% viscosity was 84 mPa·s. When it was observed by means of an optical microscope and a medium-resolution SEM, fine-fibrous cellulose having a major axis of 10-900 μm, a minor axis of 1-30 μm and a major axis/minor axis ratio of 6-100 was observed. The loss tangent was 0.19. Although it was attempted to measure the water retention thereof, the whole sample passed through a cup filter and the value could not be determined. The content of the "component stably dispersible in water" was 99% by weight. When the component was observed by means of a high resolution SEM, very fine fibrous cellulose having a major axis of 0.7-15 μm, a minor axis of 4-200 nm and a major axis/minor axis ratio of 30-350 was observed.

Example 3

The product from the whetstone rotation type pulverizer treatment in Example 2 was diluted with water to a concentration of 2% by weight, and passed through a high pressure homogenizer eight times ("Ultimizer System "Model HJP25030, manufactured by Sugino Machine, Co., Ltd., treatment pressure: 175 MPa) to obtain an aqueous suspension-form composition C. A crystallinity was 74%. A 0.25% viscosity was 69 mPa·s. When it was observed by means of an optical microscope, fine fibrous cellulose having a major axis of 10-700 μm, a minor axis of 1-30 μm and a major axis/minor axis ratio of 10-150 was observed. A loss tangent was 0.43. Although it was attempted to measure water retention thereof, the whole sample passed through a cup filter and the value could not be determined. The content of the "component stably dispersible in water" was 89% by weight. When the component was observed by means of a high resolution SEM, very fine fibrous cellulose having a major axis of 1-20 μm, a minor axis of 6-300 nm and a major axis/minor axis ratio of 30-350 was observed.

Example 4

Commercially available rice straw pulp (average degree of polymerization=810, α-cellulose content=82% by weight, water content=55% by weight) was thrown into water while tearing it by hand, and agitated until no entanglement between fibers was observed. Thus, an aqueous dispersion having a solid concentration of 3% by weight was prepared. The fiber length was 2.5 mm or less.

The aqueous dispersion thus obtained was twice treated with a whetstone-rotation type pulverizer ("Cerendipiter" Model MKCA6-3, grinder rotation number: 1,800 rpm). In the first passage, the grinder used was MKE6-46 and clearance was 100 μm, and in the second passage, the grinder was MKGAW6-80 and clearance was 50 μm. The aqueous dispersion thus obtained had a sedimentation volume of 83% by volume.

Subsequently, the aqueous dispersion thus obtained was diluted with water to make the concentration 0.5% by weight, and the diluted dispersion was passed through a high pressure homogenizer six times ("Microfluidizer" Model M-140K, treatment pressure: 175 MPa) to obtain an aqueous suspension-form composition D. The crystallinity thereof was 65%. A 0.25% viscosity was 43 mPa·s. When it was observed by means of an optical microscope, fine fibrous cellulose having a major axis of 30-800 μm, a minor axis of 1-40 μm and a major axis/minor axis ratio of 8-120 was observed. A loss tangent was 0.91. Although it was attempted to measure water retention thereof, a part of the sample passed through a cup filter but the remainder caused clogging, so that the value could not be determined. The content of the "component stably dispersible in water" was 37% by weight. When the component was observed by means of a high resolution SEM, very fine fibrous cellulose having a major axis of 1-20 μm, a minor axis of 10-300 nm and a major axis/minor axis ratio of 25-350 was observed.

Example 5

Commercially available wood pulp (average degree of polymerization=1,820, α-cellulose content=77% by weight) was cut into 6×16 mm rectangles and a sufficient amount of water was added thereto so as to give a solid concentration of 80% by weight. The mixture was passed through a cutter mill ("Comitrol" Model 1700, cutting head blade distance: 2.03 mm, impeller rotation speed: 3,600 rpm), with controlling the separation of the water and the pulp chip to a minimum. As a result, the fiber length became 0.75-3.75 mm.

The cutter mill-treated product, sodium carboxymethyl-cellulose and water were weighed out so that the concentration of sodium carboxymethyl-cellulose came to 0.0706% by weight, and the mixture was agitated until no entanglement between fibers was observed. The aqueous dispersion thus obtained was treated with a whetstone-rotation type pulverizer ("Celendipiter" Model MKCA6-3, manufactured by Masukou Sangyo, Co., Ltd.; grinder: MKE6-46, grinder rotation speed: 1,800 rpm). The treatment was carried out twice, while altering the grinder clearance as 110→80 μm, respectively. The aqueous dispersion thus obtained had a sedimentation volume of 89%.

Subsequently, the aqueous dispersion thus obtained was diluted with water to a concentration 0.5% by weight, and the diluted dispersion was passed through a high pressure homogenizer eight times (8 times) ("Microfluidizer" Model M-110Y, treatment pressure: 110 MPa) to obtain an aqueous suspension-form composition E. Crystallinity thereof was 79% or more. A 0.25% viscosity thereof was 128 mPa. When it was observed by means of an optical microscope and a medium-resolution SEM, fine fibrous cellulose having a major axis of 30-900 μm, a minor axis of 1-50 μm and a major axis/minor axis ratio of 6-200 was observed. A loss tangent was 0.45. Although it was attempted to measure water retention thereof, a part of the sample passed the cup filter but the remainder caused clogging, so that the value could not be determined. The content of the "component stably dispersible in water" was 75% by weight. When the component was observed by means of a high resolution SEM, very fine fibrous cellulose having a major axis of 1-20 μm, a minor axis of 8-150 nm and a major axis/minor axis ratio of 30-350 was observed.

Example 6

The whetstone rotation type pulverizer-treated product of Example 5 was directly passed through a high pressure homogenizer four times (4 times) ("Microfluidizer" Model 110Y, treatment pressure: 95 MPa) to obtain an aqueous suspension-form composition F. The crystallinity was 79% or higher. A 0.25% viscosity was 68 mPa·s. When it was observed by means of an optical microscope, fine fibrous cellulose having a major axis of 10-400 μm, a minor axis of 1-5 μm and a major axis/minor axis ratio of 10-300 was observed. The loss tangent was 0.64. Although it was attempted to measure water retention thereof, a part of the sample passed the cup filter but the remainder caused clogging, so that the value could not determined. The content of the "component stably dispersible in water" was 43% by weight. When the component was observed by means of a high resolution SEM, very fine fibrous cellulose having a major axis of 1-20 μm, a minor axis of 10-150 nm and a major axis/minor axis ratio of 30-300 was observed.

Example 7

The cutter mill-treated product of Example 5, sodium carboxymethyl-cellulose and water were weighed out so that the concentration of cellulose came to 3% by weight and the concentration of sodium carboxylmethyl-cellulose came to 0.106% by weight, and was agitated until no entanglement between fibers was observed. The aqueous dispersion thus obtained was treated with a whetstone-rotation type pulverizer ("Cerendipiter" Model MKCA6-3, manufactured by Masukou Sangyo, Co., Ltd.; grinder: MKE6-46, grinder rotation speed: 1,800 rpm). The treatment was carried out twice while altering the grinder clearance to 150→120 μm, respectively. The aqueous dispersion thus obtained had a sedimentation volume of 91%.

Subsequently, the aqueous dispersion thus obtained was diluted with water to make the concentration 3% by weight, and the diluted dispersion was passed through a high pressure homogenizer five times (5 times) ("Microfluidizer" Model M-140K, treatment pressure: 200 MPa) to obtain an aqueous suspension-form composition G. Crystallinity thereof was 76% or higher. A 0.25% viscosity thereof was 67 mPa. When it was observed by means of an optical microscope, fine fibrous cellulose having a major axis of 20-700 μm, a minor axis of 1-50 μm and a major axis/minor axis ratio of 5-150 was observed. The loss tangent was 0.31. Although it was attempted to measure water retention thereof, a part of the sample passed the cup filter but the remainder caused clogging, so that the value could not be determined. The content of the "component stably dispersible in water" was 59% by weight. When it was observed by means of a high resolution SEM, very fine fibrous cellulose having a major axis of 1-15 μm, a minor axis of 10-80 nm and a major axis/minor axis ratio of 30-300 was observed.

Example 8

Sodium carboxymethylcellulose was added to the aqueous suspension-form composition C (Example 3) so that the ratio of cellulose:sodium carboxymethylcellulose came to 85:15 (parts by weight), and agitated and mixed with an agitation type homogenizer for 15 minutes.

Subsequently, the aqueous suspension-form composition was dried by means of a drum drier and scraped out by means of a scraper. It was pulverized by means of a cutter mill ("Flush Mill", manufactured by Fuji Powdal, Co., Ltd.) to such an extent that the pulverized material come to almost completely pass through a sieve having a mesh size of 1 mm to obtain an water-dispersible dry composition H.

The water-dispersible dry composition H had a crystallinity of 71% or above, a 0.25% viscosity of 61 mPa·s, and a loss tangent of 0.51. The content of the "component stably suspensible in water" was 75% by weight. When the component was observed by means of a high resolution SEM, very fine fibrous cellulose having a major axis of 1-20 μm, a minor axis of 10-300 nm and a major axis/minor axis ratio of 30-350 was observed.

Example 9

Sodium carboxymethylcellulose was added to the aqueous suspension-form composition F (Example 6) so that the ratio of cellulose:sodium carboxymethylcellulose came to 80:20 (parts by weight), and agitated and mixed by an agitation type homogenizer for 15 minutes.

Subsequently, the aqueous suspension-form composition was dried by means of a drum drier and scraped out by means of a scraper. It was pulverized by means of a cutter mill ("Flush Mill") to such an extent that the pulverized material became to almost completely pass through a sieve having a mesh size of 1 mm to obtain an water-dispersible dry composition I.

The water-dispersible dry composition I had a crystallinity of 77% or higher, a 0.25% viscosity of 66 mPa·s, and a loss tangent of 0.65. The content of the "component stably suspensible in water" was 40% by weight. When the component was observed by means of a high resolution SEM, very fine fibrous cellulose having a major axis of 1-20 μm, a minor axis of 10-150 nm and a major axis/minor axis ratio of 30-300 was observed.

Example 10

Commercially available bagasse pulp (average degree of polymerization=1,320, α-cellulose content=77%) was cut into 6×16 mm rectangles. Bagasse pulp, sodium carboxymethyl-cellulose and water were weighed out so that the concentration of cellulose came to 3% by weight and the concentration of sodium carboxymethyl-cellulose came to 0.176% by weight, and the mixture was agitated by means of a domestic mixer for 5 minutes.

The aqueous dispersion thus obtained was treated three times with a whetstone-rotation type pulverizer ("Cerendipiter" Model MKCA6-3, grinder: MKE6-46, grinder rotation speed: 1,800 rpm). The aqueous dispersion thus obtained had a sedimentation volume of 100 by volume.

Subsequently, the aqueous dispersion thus obtained was diluted with water to make the concentration 2% by weight, and the diluted dispersion was passed through a high pressure homogenizer four times (4 times) ("Microfluidizer" Model M-140K, treatment pressure 110 MPa) to obtain an aqueous suspension-form composition. The crystallinity thereof was 73% or higher. A 0.25%. The viscosity thereof was 120 mPa·s. When it was observed by means of an optical microscope and a medium resolution SEM, fine fibrous cellulose having a major axis of 10-500 μm, a minor axis of 1-25 μm and a major axis/minor axis ratio of 5-190 was observed. A loss tangent was 0.32. The content of the "component stably dispersible in water" was 99% by weight.

Sodium carboxymethyl-cellulose was added to the aqueous suspension-form composition so that the cellulose:sodium carboxymethyl-cellulose ratio came to 85:15 (parts by weight), and the mixture was agitated and mixed by an agitation type homogenizer for 15 minutes. Subsequently, the aqueous suspension-form composition was dried by means of a drum drier and scraped out by means of a scraper. It was pulverized by means of a cutter mill ("Flush Mill", manufactured by Fuji Powdal, Co., Ltd.) to such an extent that the pulverized material came to almost completely pass through a sieve having a mesh size of 2 mm to obtain a water-dispersible dry composition J. The water-dispersible dry composition J had crystallinity of 73%, a 0.25% viscosity of 143 mPa·s, and a loss tangent was 0.38. The content of the "component stably suspensible in water" was 98% by weight. When the "component stably dispersible in water" was observed by means of a high resolution SEM, very fine fibrous cellulose having a major axis of 1-17 μm, a minor axis of 10-350 nm and a major axis/minor axis ratio of 20-250 was observed.

Example 11

Gel-forming composition K was prepared by mixing water-dispersible dry composition H (85 parts by weight) and sodium alginate (viscosity of 1% aqueous solution thereof was 500-600 mPa·s at 20° C.) (15 parts by weight).

Subsequently, Composition K and water were weighed out so as to give a solid component concentration of 1% by weight, and dispersed by means of Ace Homogenizer (Model AM-T, manufactured by Nippon Seiki, Co., Ltd.) at 15,000 rpm for 10 minutes at 25° C. The dispersion was filled into a cylindrical glass vessel having an inner diameter of 45 mm up to a height of about 45 mm and left to stand at 5° C. for 24 hours to obtain a gel composition. The gel strength at 5° C. was 0.04N.

The gel strength (breaking strength) was measured directly, without removing the gel composition from the container, by means of Rheometer ("RHEO METER" Model NRM-2002J; pushing-in jig: 10 mmϕspherical jig; velocity of pushing-in 2 cm/min.)<

Example 12

Gel-forming composition L was prepared by mixing water-dispersible dry composition H (85 parts by weight) and guar gum (viscosity of 1% aqueous solution thereof at 25° C.: 900-1,100 mPa·s) (15 parts by weight).

Subsequently, Composition L and water were weighed out so as to give a solid component concentration of 1% by weight, and dispersed by means of Ace Homogenizer at 15,000 rpm for 10 minutes at 80° C. The dispersion was filled into a cylindrical glass vessel having an inner diameter of 45 mm up to a height of about 45 mm and left to stand at 5° C. for 24 hours to obtain a gel composition. The gel strength at 5° C. was 0.16N. The gel strength was measured in the same manner as in Example 11.

Example 13

Gel-forming composition M was prepared by mixing water-dispersible dry composition H (60 parts by weight) and glucomannan (viscosity of 1% aqueous solution thereof after standing at 25° C. for 7 hours: 100 Pa·s or higher) (40 parts by weight).

Subsequently, Composition M and water were weighed out so as to give a solid component concentration of 1% by weight, and dispersed by means of Ace Homogenizer at 15,000 rpm for 10 minutes at 80° C. The dispersion was filled into a cylindrical glass vessel having an inner diameter of 45 mm up to a height of about 45 mm and left to stand at 5° C. for 24 hours to obtain a gel composition. The gel strength at 5° C. was 0.32N.

When the gel composition was left to stand at 60° C. for 24 hours, its gel strength (60° C.) became 1.6N. Neither separation of water nor deformation was observed.

When the gel composition was heat treated at 120° C. for 15 minutes immediately after the dispersing operation, a gel composition having a gel strength (25° C.) of 0.36N was obtained. The gel strengths were all measured in the same manner as in Example 11.

Example 14

Gel-forming composition N was prepared by mixing water-dispersible dry composition I (60 parts by weight) and glucomannan (viscosity of 1% aqueous solution thereof at 25° C.: 900-1,100 Pa·s) (40 parts by weight).

Subsequently, Composition N and water were weighed out so as to give a solid component concentration of 1% by weight, and dispersed by means of Ace Homogenizer at 15,000 rpm for 10 minutes at 80° C. The dispersion was filled into a cylindrical glass vessel having an inner diameter of 45 mm up to a height of about 45 mm and left to stand at 5° C. for 24 hours to obtain a gel composition. The gel strength at 5° C. was 0.11N. When the gel composition was left to stand at 80° C. for 3 hours for the sake of heat treatment, its gel strength (80° C.) increased to 0.33N. Neither separation of water nor deformation was observed. The gel maintained roughly the same gel strength (0.31N) even when cooled to 5° C. The gel strengths were all measured in the same manner as in Example 11.

Example 15

A gel composition was prepared by weighing out water-dispersible dry composition I, purified guar gum (viscosity of 1% aqueous solution thereof at 25° C.: 5-6 Pa·s) and water so that the concentrations of water-dispersible dry composition I and the guar gum came to 0.9% by weight and 0.1% by weight, respectively, dispersing the mixture by means of Ace Homogenizer at 15,000 rpm for 10 minutes at 80° C., and then allowing it to stand at 5° C. for 24 hours. Gel strength at 5° C. was 0.09N. When the gel was heat treated (standing at 80° C. for 3 hours), the gel strength increased to 0.12N at 80° C. Neither separation of water nor deformation was observed. Even when cooled to 5° C., this gel composition maintained roughly the same gel strength (0.11N).

All the gel strengths were measured in the same manner as in Example 11.

Example 16

A gel composition was prepared by weighing out water-dispersible dry composition J, glucomannan (viscosity of 1% aqueous solution thereof after standing at 25° C. for 7 hours: 100 Pa·s or higher) and water so that the concentrations of water-dispersible dry composition J and the glucomannan came to 0.7% by weight and 0.3% by weight, respectively, dispersing the mixture by means of an Ace Homogenizer at 15,000 rpm for 10 minutes at 80° C., and then heat-treating it (leaving it to stand at 80° C. for 3 hours). The gel strength at 25° C. was 0.10N.

When the gel composition thus obtained was heated to 60° C., the gel-strength became 0.17N. Neither separation of water nor deformation was observed.

In another experiment, water-dispersible composition J was thrown into hot water of 80° C. and dispersed by means of an Ace Homogenizer at 15,000 rpm for 5 minutes to obtain an aqueous dispersion of 1% by weight. On the other hand, glucomannan was thrown into water at 25° C. and swollen for 7 hours to obtain a swollen solution of 1% by weight. After cooling them to 5° C. separately, they were mixed together and dispersed at a ratio of 7:3 (water-dispersible dry composition J:glucomanna=7:3) by means of an Ace Homogenizer at 15,000 rpm for 5 minutes, and further heat treated at 80° C. for 5 minutes to obtain a gel composition. The gel strength was 0.21N at 25° C.

All the gel strengths were measured in the same manner as in Example 11.

Example 17

Water-dispersible dry composition J was thrown into hot water at 80° C. and dispersed by means of an Excel Auto-homogenizer (Model ED-7, manufactured by Nippon Seiki, Co., Ltd.) at 15,000 rpm for 10 minutes, after which tara gum was added and dispersed at 15,000 rpm for 10 minutes to obtain a liquid mixture containing 0.9% by weight of the water-dispersible dry composition J and 0.1% by weight of the tara gum. The resulting mixture was left to stand at 5° C. for 72 hours to obtain a gel composition. Gel strength thereof was 0.15N at 25° C. When it was heated to 60° C., the gel strength increased to 0.17N. Neither separation of water nor deformation was observed. All the gel strengths were measured in the same manner as in Example 11.

Comparative Example 1

Commercially available wood pulp (average degree of polymerization=1,050, α-cellulose content=97% by weight) was cut into 6×16 mm rectangles and dipped into a sufficient amount of water. After ascertaining that the pulp had wholly been wet with water, the water was lightly swished off on a sieve. At that time, concentration of solid component was 76% by weight. When the wet pulp was passed once through a cutter mill ("Comitrol" Model 1700, cutting head blade distance: 2.03 mm, impeller rotation speed: 3,600 rpm), the fiber length came to 0.75-3.25 mm.

The cutter mill-treated product and water were weighed out so as to give a fiber content of 2% by weight, and the mixture was agitated until no entanglement between fibers was observed. The aqueous dispersion thus obtained was treated with a whetstone-rotation type pulverizer ("Cerendipiter" Model MKCA6-3, manufactured by Masukou Sangyo, Co., Ltd.; grinder: MKE6-46, grinder rotation speed: 1,800 rpm). The treatment was carried out twice while altering the grinder clearance to 110→80 μm, respectively. The aqueous dispersion thus obtained had a sedimentation volume of 90% by volume.

Subsequently, the aqueous dispersion thus obtained was diluted with water to make the concentration 1% by weight, and the diluted dispersion was passed through a high pressure homogenizer eight times (8 times) ("Microfluidizer" Model M-110Y, treatment pressure: 110 MPa) to obtain aqueous cellulose dispersion a. A 0.25% viscosity thereof was 36 mPa·s. When it was observed by means of an optical microscope and a medium-resolution SEM, a fibrous cellulose having a major axis of 40-1,000 μm, a minor axis of 1-65 μm and a major axis/minor axis ratio of 4-100 was observed. When made into a 0.5% by weight aqueous solution, its loss tangent was 1.1. Although it was attempted to measure the water retention thereof, a part of the sample passed through the cup filter and the remainder caused clogging, so that the value could not be determined. The content of the "component stably dispersible in water" was 18% by weight.

Comparative Example 2

Commercially available wood pulp (average degree of polymerization=1,210, α-cellulose content=94% by weight) was cut into 6×16 mm rectangles and dipped into a sufficient amount of water. After ascertaining that the pulp had been wholly wet with water, the water was swished off on a sieve. At that time, concentration of the solid component was 78% by weight. When the wet pulp was passed once through a cutter mill ("Comitrol" Model 1700, cutting head blade distance 2.03 mm, impeller rotation speed 3,6000 rpm), the fiber length came to 0.25-3.25 mm.

The cutter mill-treated product and water were weighed out so as to give a fiber concentration of 2% by weight, and the mixture was agitated until no entanglement between fibers was observed. The aqueous dispersion thus obtained was treated with a whetstone-rotation type pulverizer ("Cerendipiter" Model MKCA6-3, grinder: MKE6-46, grinder rotation speed: 1,800 rpm). The treatment was carried out twice while altering the grinder clearance to 110→80 μm, respectively. The aqueous dispersion thus obtained had a sedimentation volume of 88% by volume.

Subsequently, the aqueous dispersion thus obtained was diluted with water to make the concentration 1% by weight, and the diluted dispersion was passed through a high pressure homogenizer eight times (8 times) ("Microfluidizer" Model M-110Y, treatment pressure: 110 MPa) to obtain aqueous cellulose dispersion b. A 0.25% viscosity thereof was 56 mPa·s. When it was observed by means of an optical microscope, a fibrous cellulose having a major axis of 50-1,050 μm, a minor axis of 1-50 μm and a major axis/minor axis ratio of 4-150 was observed. The loss tangent was 0.92. Although it was attempted to measure water retention thereof, a part of the sample passed through the cup filter but the remainder caused clogging, so that the value could not be determined. The content of the "component stably dispersible in water" was 25% by weight.

Comparative Example 3

Commercially available cellulose powder (average degree of polymerization=390, α-cellulose content=72% by weight) was dispersed in water so as to give a concentration of 3% by weight. The fiber length was 0.005-2 mm. The aqueous dispersion was treated with a whetstone rotation type pulverizer ("Cerendipiter" Model MKCA6-3, grinder: MKGAW6-80, grinder rotation speed: 1,800 rpm). The treatment was carried out twice while altering the grinder clearance to 80 and 50 μm, respectively. The aqueous dispersion thus obtained had a sedimentation volume of 78% by volume.

Subsequently, the aqueous dispersion thus obtained was diluted with water to make the concentration 1% by weight, and the diluted dispersion was passed through a high pressure homogenizer eight times (8 times) ("Microfluidizer" Model M-110Y, treatment pressure: 110 MPa) to obtain aqueous cellulose dispersion c. A 0.25% viscosity thereof was 69 mPa·s. When it was observed by means of an optical microscope, a fibrous particle having a major axis of 5-60 μm, a minor axis of 1-30 μm and a major axis/minor axis ratio of 3-25 was observed. The loss tangent was 1.8. Although it was attempted to measure the water retention thereof, the whole sample passed through the cup filter, so that the value could not be determined. The content of the "component stably dispersible in water" was 69% by weight. However, when it was observed by means of a high resolution SEM, the fiber was found to be highly shortened and to have a major axis of 0.2-1 μm, a minor axis of 20-70 nm and a major axis/minor axis ratio of 6-30.

Examples 18-27

By using water-dispersible cellulose A, aqueous suspension-form compositions B to G and water-dispersible dry compositions H to J as the products of the present invention, cocoa drinks were prepared. First, the ingredients and hot water (80° C.) were weighed out so that the concentrations of the ingredients came to as follows: the product of the present invention 0.05% (solid), cocoa powder 0.5%, whole milk powder 0.8%, granulated sugar 5.0%, emulsifier (monoglyceride stearate of medium purity) 0.2%, and edible salt 0.05%. The mixture was agitated for 10 minutes with a propeller agitator at 600 rpm at 80° C., provided that in the cases of water-dispersible dry compositions H and I, they were exceptionally used after being subjected to preliminarily dispersion (0.5% aqueous dispersion was dispersed with an Ace Homogenizer at 15,000 rpm for 15 minutes, at 80° C.).

Subsequently, the dispersion was twice subjected to a homogenizing treatment with a piston type homogenizer at 15 and 20 MPa, respectively, poured into a glass-made pressure-resistant bottle, and sterilized at 121° C. for 30 minutes. After cooling the sterilized mixture to a room temperature with running water, it was shaken about 10 times and stirred by hand, and then allowed to stand in an atmosphere of 60° C. for one week.

In cocoa drinks, important problems include (1) that the cocoa particles precipitate over time and adhere to the bottom of a container, (2) that the once precipitated cocoa particles are difficult to re-disperse even by shaking the container, (3) that the milk components and the oily component of cocoa separate and gather in the upper part of the drink (oil-off), and (4) that addition of a stabilizer causes a rise in viscosity and deterioration of swallowing feel (mouth feel), etc. The results of evaluations as to these items are summarized in Table 1.

TABLE 1

| | Evaluation of cocoa drinks | | | | | | | | | |
|---|---|---|---|---|---|---|---|---|---|---|
| | Examples | | | | | | | | | |
| | 18 | 19 | 20 | 21 | 22 | 23 | 24 | 25 | 26 | 27 |
| | Products of the present invention | | | | | | | | | |
| | Water-dispersible cellulose | Aqueous suspension-form composition | | | | | | Water-dispersible dry composition | | |
| | A | B | C | D | E | F | G | H | I | J |
| Viscosity (mPa · s) *1 | 5.9 | 6.1 | 4.4 | 2.4 | 7.2 | 4.6 | 3.5 | 4.6 | 5.1 | 5.5 |
| Volume of cocoa powder layer (%) *2 | 100 | 100 | 32 | 23 | 85 | 45 | 52 | 20 | 29 | 35 |

TABLE 1-continued

Evaluation of cocoa drinks

| | Examples | | | | | | | | | |
|---|---|---|---|---|---|---|---|---|---|---|
| | 18 | 19 | 20 | 21 | 22 | 23 | 24 | 25 | 26 | 27 |
| | | | | Products of the present invention | | | | | | |
| | Water-dispersible cellulose | | Aqueous suspension-form composition | | | | | Water-dispersible dry composition | | |
| | A | B | C | D | E | F | G | H | I | J |
| Adhesion of cocoa to container bottom | None | None | None | None | None | None | None | None | None | None |
| Re-dispersibility of cocoa powder layer (times) *3 | — | — | 1 | 1 | 1 | 1 | 1 | 1 | 1 | 1 |
| Oil-off | None | None | None | None | None | None | None | None | None | None |

*1 Viscosity was measured just after preparation of sample (B-type viscometer with BL adapter, rotor rotation speed 12 rpm, at 25° C.).
*2 Expressing the % by volume of cocoa powder layer in drink. When it is 100%, cocoa powder is uniformly suspended in the drink. When it is 1%, most of the cocoa powder precipitates and adheres to the bottom of container.
*3 An operation of turning the container upside down and then returning it to original position is counted as one. The number of repetition of the operation needed for re-dispersing the cocoa powder layer to make the system uniform is usedfor the evaluation, (-: not coming under the condition). A smaller number means a better re-dispersibility, which is preferable.

It is apparent from the results that the product of the present invention brought about an effect of completely suspending cocoa or an effect of making re-dispersion of the precipitated cocoa easy, even if some extent of precipitation is observed, with a small amount as 0.05% of the product. In addition, there was an effect of preventing the oil-off, while maintaining a relatively low viscosity.

Comparative Examples 4 and 5

Cocoa drinks were prepared and evaluated according to Example 14, except that the products of the present invention were replaced with a commercially available fine cellulose ("Ceolus Cream" FP-03, manufactured by Asahi Kasei Kabushiki Kaisha). For these compositve examples, the amount of the fine cellulose (solid) was 0.05% by weight and 0.4% by weight, respectively. The results of the evaluation are shown in Table 2.

The fine cellulose used had a 0.25% viscosity of 1 mPa·s. Although it had a rather obscure particle shape as observed under an optical microscope, its major axis was about 5-10 μm, minor axis was about 1-2 μm and major axis/minor axis ratio was about 5. The loss tangent was not measurable because its viscoelasticity was lower than the detection limit of the apparatus. Although it was attempted to measure its water retention, the whole sample passed through a cup filter so that the value could not be determined. The content of the component obtained by the method for measuring the content of the "component stably dispersible in water" was 65% by weight. When both samples were observed by means of a high resolution SEM, rod-like particles having a major axis of 100-300 nm, a minor axis of 20-50 nm, and a major axis/minor axis ratio of 4-10 were observed.

Comparative Examples 6 and 7

Cocoa drinks were prepared and evaluated according to Example 14, except that the products of the present invention were replaced with commercially available microfibrillated cellulose ("Celish" FD-100G, manufactured by Daicel Kagaku Kogyo, Co., Ltd.). The amounts (solid) of the microfibrillated cellulose were 0.05% and 0.4% by weight. Results of the evaluation are listed in Table 2.

A 0.25% viscosity of the microfibrillated cellulose used was 41 mPa·s. When observed under an optical microscope, the shape of the particles was as follows: major axis 100-500 μm, minor axis 2-40 μm, and major axis/minor axis ratio 10-200. Its loss tangent was 0.64, and its water retention was 390%. The content of the component obtained by the method for measuring the content of the "component stably dispersible in water" was 14% by weight. When the component was observed by means of a high resolution SEM, fibrous particles having a major axis of 1-20 μm, a minor axis of 10-100 nm and a major axis/minor axis ratio of 10-300 were observed.

Comparative Examples 8-11

Cocoa drinks were prepared and evaluated according to Example 14, except that the products of the present invention were replaced with aqueous cellulose dispersions a to c, and the product of the present invention was absent (blank) in the other example. The amount of the aqueous dispersion of cellulose was adjusted at 0.05% by weight as expressed in terms of solid component. The results of the evaluation are shown in Table 2.

TABLE 2

Evaluation of cocoa drinks

| | Comparative Example | | | | | | | |
|---|---|---|---|---|---|---|---|---|
| | 4 | 5 | 6 | 7 | 8 | 9 | 10 | 11 |
| | | | | Comparative product | | | | |
| | Fine cellulose | | Microfibrillated cellulose | | Aqueous cellulose dispersion | | | Blank |
| | | | | | a | b | c | |
| Amount of comparative product (solid) (%) | 0.05 | 0.4 | 0.05 | 0.4 | 0.05 | 0.05 | 0.05 | 0 |
| Viscosity (mPa·s) *1 | 1.7 | 2.7 | 1.9 | 3.4 | 1.8 | 1.6 | 1.6 | 1.6 |
| Volume of cocoa powder layer (%) *2 | 1 | 63 | 1 | 56 | 1 | 1 | 1 | 1 |
| Adhesion of cocoa to container bottom | Found | None | Found | Found | Found | Found | Found | Found |
| Re-disdpersibility of adhered cocoa/cocoa powder layer (times) *3 | 12 | 1 | 11 | 5 | 12 | 13 | 9 | 15 |
| Oil-off | Found | None | None | None | None | None | None | Found |

*1 Viscosity was measured just after preparation of the sample (B-type viscometer with BL adapter, rotor rotation speed 12 rpm, at 25° C.).
*2 Expressing % by volume of cocoa powder layer in drink. When it is 100%, the cocoa powder is uniformly suspended in the drink. When it is 1%, most of the cocoa powder precipitates and adheres to the bottom of container.
*3 An operation of turning the container upside down and returning it to its original position is counted as one. The number of repetition needed to re-disperse the adhered cocoa powder and the cocoa powder layer, to make thesystem uniform, was evaluated. A smaller number means a better re-dispersibility, which is preferable.

Although the fine cellulose and microfibrillated cellulose could exhibit effects similarly to those of the products of the present invention, these materials had to be used in an amount about 8 times as large as the product of the present invention.

Examples 28-30

Sour milk drinks were prepared with aqueous suspension-form compositions C and F and water-dispersible dry composition I of the present invention. First, pectin ("UNIPECTIN" AYD-358, manufactured by SYSTEMS BIO-INDUSTRIES) was dissolved in hot water at 80° C. to prepare a 2% by weight aqueous solution. The solution was stored overnight at 5° C. Then, the product of the present invention, a commercially available five-fold concentrated acid milk, 2% aqueous pectin solution and water were weighed out so as to give the concentration of the product of the present invention of 0.003% (solid content), the concentration of the five-fold concentrated acid milk of 20% and the concentration of the 2% aqueous pectin solution of 1.5%. The mixture was then agitated for 5 minutes (propeller agitation, 500 rpm, room temperature); provided that in the case of the water-dispersible dry composition I, it was used after being subjected to preliminary dispersion, namely dispersion of 0.5% aqueous dispersion thereof with an Ace Homogenizer at 15,000 rpm for 15 minutes at 80° C.

Next, it was subjected to a homogenizing treatment with a piston type homogenizer (15 MPa), heated and sterilized at 85° C. for 10 minutes while agitating it with a propeller, poured into a glass container, cooled to a room temperature with running water, shaken and agitated by hand about 10 times, and thereafter left to stand in an atmosphere of 60° C. for 3 days.

Problems of sour milk drinks include: (1) that the milk protein particles precipitate over time and adhere to the container bottom, (2) that the once precipitated milk protein particles cannot readily be re-dispersed even if the container is shaken, (3) that if a stabilizer is added excessively, viscosity rises even though suspension stability increases, and the mouth feel is thereby adversely affected (a pasty feeling appears). The results of evaluations as to these items are listed in Table 3.

TABLE 3

Evaluation of sour milk drinks

| | Examples | | |
|---|---|---|---|
| | 28 | 29 | 30 |
| | Products of the present invention | | |
| | Aqueous suspension-form composition | | Water-dispersible dry composition |
| | C | F | I |
| Viscosity (mPa·s) *1 | 3.1 | 3.2 | 3.0 |
| Volume of sedimented milk protein (%) | 2 | 2 | 2 |
| Re-dispersibility of sedimented milk protein (times) *2 | 2 | 2 | 4 |

*1 Viscosity was measured just after preparation of the sample (B-type viscometer with BL adapter, rotor rotation speed 12 rpm, at 25° C.).
*2 An operation of turning the container upside-down and then returning it to the original position is counted as one. Re-dispersibility of sedimented milk protein is evaluated by counting the number of operations needed for re-dispersing and making the sedimented milk protein disappear. A smaller number means a better re-dispersibility, which is preferable.

It is apparent from the results, although the products of the present invention could not prevent the sedimentation of milk protein particles, the improved the re-dispersibility of sedimented milk protein particles, even when used in very small amounts. Though the viscosity was at most 3.2 mPa·s, the viscosity was hardly felt upon drinking, and no pasty feel was perceived.

Comparative Examples 12-18

Sour milk drinks were prepared and evaluated for the cases where the same fine cellulose as used in Comparative Example 4, the same microfibrillated cellulose as used in Comparative Example 5 and aqueous dispersion b-c at a prescribed concentration were used instead of the product of the present invention and the case where the product of the present invention was absent (blank). The results of the evaluation are shown in Table 4.

TABLE 4

| Evaluation of cocoa drinks | | | | | | |
|---|---|---|---|---|---|---|
| Comparative Example | | | | | | |
| 12 | 13 | 14 | 15 | 16 | 17 | 18 |
| Comparative produce | | | | | | |
| Fine cellulose | Microfibrillated cellulose | Aqueous cellulose dispersion b | Aqueous cellulose dispersion c | Blank | | |

| | 12 | 13 | 14 | 15 | 16 | 17 | 18 |
|---|---|---|---|---|---|---|---|
| Amount of comparative product (solid) (%) | 0.003 | 0.05 | 0.003 | 0.05 | 0.003 | 0.003 | 0 |
| Viscosity (mPa·s) *1 | 2.2 | 2.4 | 2.2 | 2.5 | 2.2 | 2.3 | 2.2 |
| Volume of sedimented milk protein powder layer (%) *2 | 1 | 2 | 1 | 3 | 1 | 1 | 1 |

TABLE 4-continued

| Evaluation of cocoa drinks | | | | | | |
|---|---|---|---|---|---|---|
| Comparative Example | | | | | | |
| 12 | 13 | 14 | 15 | 16 | 17 | 18 |
| Comparative produce | | | | | | |
| Fine cellulose | Microfibrillated cellulose | Aqueous cellulose dispersion b | Aqueous cellulose dispersion c | Blank | | |

| | 12 | 13 | 14 | 15 | 16 | 17 | 18 |
|---|---|---|---|---|---|---|---|
| Re-dispersibility of sedimented milk protein (times) | 44 | 3 | 10 | 4 | 11 | 30 | 46 |

*1 Viscosity was measured just after preparation of sample (B-type viscometer with BL adapter, rotor rotation speed 12 rpm, at 25° C.).
*2 An operation of turning the container upside-down and then returning it to the original position is counted as one. Re-dispersbility of sedimented milk protein is evaluated by counting the number of operations needed for re-dispersing andmaking the sedimented milk protein disappear. A smaller number means a better re-dispersibility, which is preferable.

Although fine cellulose and microfibrillated cellulose could also exert similar effects to those of the product of the present invention, they had to be used in an amount 10 times as large as that of the present invention or more.

Examples 31-33

Water-dispersible dry composition H, I or J was added to hot water and dispersed with an Ace Homogenizer (Model AM-T, manufactured by Nippon Seiki, Co., Ltd.) at 15,000 rpm for 15 minutes at 80° C. to prepare a 0.5% dispersion. To 1-20 parts of this dispersion were added hot water (80° C.), 48 parts of coffee extract solution, 12.5 parts of milk (defatted solid component 8.8%, milk fat 3.8%), 6 parts of sugar, 0.06 parts of sodium hydrogen carbonate, and 0.03 parts of sucrose palmitic ester. The amount of the hot water was adjusted to give a total amount of 100 parts. The liquid mixture thus obtained was agitated by means of a propeller at 80° C. for 10 minutes, then twice homogenized with a piston type homogenizer (primary pressure: 15 MPa, secondary pressure: 5 MPa) and poured into a glass-made heat-resistant bottle having a capacity of 200 mL. It was sterilized at 121° C. for 30 minutes, and cooled with running water to obtain a milk coffee. The milk coffee was left to stand in an atmosphere of 5, 25 or 60° C. for one month, and the uniformity of appearance (the presence of oil-off, coagulation, sedimentation) was visually examined. The results are shown in Table 5. Viscosity of samples was measured from the manufacture after one day storage at 5° C.), using a B-type viscometer with a BL adapter, at a rotor rotation speed of 60 rpm.

TABLE 5

| Results of storage test of milk coffee (one month storage) | | | | | | | | | | |
|---|---|---|---|---|---|---|---|---|---|---|
| Amount of water-dispersible dry composition | | Example 31 Formulation I | | | Example 32 Formulation J | | | Example 33 Formulation H | | |
| | Storage temperature (° C.) | 5 | 25 | 60 | 5 | 25 | 60 | 5 | 25 | 60 |
| 0.005% | Appearance/Oil-off | − | + | + | − | − | + | − | + | + |
| | Appearance/Coagulation | − | − | − | − | − | − | − | − | − |
| | Appearance/Sedimentation | + | + | + | − | + | + | + | + | + |
| | Viscosity (mPa·s) | | 1.9 | | | 1.9 | | | 1.9 | |

TABLE 5-continued

Results of storage test of milk coffee (one month storage)

| Amount of water-dispersible dry composition | Storage temperature (° C.) | Example 31 Formulation I | | | Example 32 Formulation J | | | Example 33 Formulation H | | |
|---|---|---|---|---|---|---|---|---|---|---|
| | | 5 | 25 | 60 | 5 | 25 | 60 | 5 | 25 | 60 |
| 0.02% | Appearance/Oil-off | − | − | + | − | − | − | − | − | − |
| | Appearance/Coagulation | − | − | + | − | − | − | − | − | + |
| | Appearance/Sedimentation | − | + | + | − | − | − | − | − | − |
| | Viscosity (mPa · s) | | 2.1 | | | 2.2 | | | 2.0 | |
| 0.05% | Appearance/Oil-off | − | − | + | − | − | − | − | − | − |
| | Appearance/Coagulation | − | + | + | − | − | + | − | − | + |
| | Appearance/Sedimentation | − | − | + | − | − | + | − | − | + |
| | Viscosity (mPa · s) | | 3.5 | | | 4.0 | | | 3.3 | |
| 0.1% | Appearance/Oil-off | − | − | − | − | − | − | − | − | − |
| | Appearance/Coagulation | − | + | + | + | + | + | − | + | + |
| | Appearance/Sedimentation | − | + | + | + | + | + | − | + | + |
| | Viscosity (mPa · s) | | 7.2 | | | 8.3 | | | 6.8 | |

[Criterion for evaluation of appearances]
−: Not occurring at all
±: Very slightly occurring
+: Occurring
++: Remarkably occurring Comparative Example 19 mentioned hereinbelow resents a recipe containing no water-dispersible dry composition of the present invention. In this case, sedimentation of milk protein and oil-off were observed. Contrariwise, according to the present examples, the sedimentation and oil-off were remarkably suppressed due to addition of water-dispersible dry composition; provided that an increase in the amount of composite material tends to promote coagulation to some extent. The expression "±" namely "very slightly occurring" means a state where the system can easily be made uniform by shaking it with hand, and which is good enough to be used practically.

Example 34

A milk coffee was prepared in the same manner as in Example 31, except that water-dispersible dry composition I was replaced with aqueous suspension-form composition F. The amount of F in the milk coffee was 0.025% as a solid. The results of the evaluation carried out in the same manner as in Example 31, are shown in Table 6.

Example 35

A milk coffee was prepared in the same manner as in Example 31, except that the water-dispersible dry composition I was replaced with aqueous suspension-form composition C and ι-carrageenan was compounded. The amount of C was 0.02% as expressed in terms of solid component. ι-carrageenan was added in an amount of 0.005%. The results of the evaluation as in Example 31 are shown in Table 6.

TABLE 6

Results of storage test of milk coffee (one month storage)

| | Example 34 | | | Example 35 | | |
|---|---|---|---|---|---|---|
| Storage temperature (° C.) | 5 | 25 | 60 | 5 | 25 | 60 |
| Appearance/Oil-off | − | ± | ± | − | ± | ± |
| Appearance/Coagulation | − | − | ± | − | − | ± |

TABLE 6-continued

Results of storage test of milk coffee (one month storage)

| | Example 34 | | | Example 35 | | |
|---|---|---|---|---|---|---|
| Storage temperature (° C.) | 5 | 25 | 60 | 5 | 25 | 60 |
| Appearance/Sedimentation | − | − | ± | − | − | ± |
| Viscosity (mPa · s) | | 2.3 | | | 2.2 | |

(Criterion for evaluation of appearances)
−: Not occurring at all
±: Very slightly occurring
+: Occurring
++: Remarkably occurring Comparative Example 19

A milk coffee was prepared in the same manner as in Example 31, except that the water-dispersible dry composition I was not used. Results of evaluation as in Example 31 are shown in Table 7.

In this recipe, a stabilizer was not particularly added, except that a bacteriostatic emulsifier (sucrose palmitic ester) was added. In this case, sedimentation of milk protein and oil-off were observed. It is difficult to commercialize the milk coffee in such a state, even if it is packaged in a can.

Comparative Example 20

A milk coffee was prepared in the same manner as in Example 31, except that 0.2 part of high-purity monoglyceride stearate was added and the water-dispersible dry composition I was not used. Results of the same evaluation as in Example 31 are shown in Table 7.

When stored at 25° C., a severe coagulation of the milk component was observed. At 60° C., a little oil-off and a clear sedimentation were observed.

Comparative Example 21

A milk coffee was prepared in the same manner as in Example 31, except that 0.2 part of high-purity monoglyceride stearate and 0.1 part of a crystalline cellulose preparation ("Avicel" RC-591, manufactured by Asahi Kasei Kabushiki Kaisha) were added, and the water-dispersible dry composition I was not used. Results of evaluation as in Example 31 are shown in Table 7. This Comparative Example represents the technique disclosed in JP-A-6-335348.

Comparative Example 22

A milk coffee was prepared in the same manner as in Example 31, except that 0.2 part of high-purity monoglyceride stearate and 0.3 part of a microcrystalline cellulose preparation ("Avicel" RC-591, manufactured by Asahi Kasei Kabushiki Kaisha) were added, and the water-dispersible dry composition I was not used. Results of the evaluation as in Example 31 are shown in Table 7. This Comparative Example represents the technique disclosed in JP-A-6-335348.

TABLE 7

Results of storage test of milk coffee (one month storage)

|  | Comparative Example 19 | | | Comparative Example 20 | | | Comparative Example 21 | | | Comparative Example 22 | | |
| --- | --- | --- | --- | --- | --- | --- | --- | --- | --- | --- | --- | --- |
| Storage temperature (° C.) | 5 | 25 | 60 | 5 | 25 | 60 | 5 | 25 | 60 | 5 | 25 | 60 |
| Appearance/Oil-off | ± | + | + | − | *1 | ± | − | − | − | − | − | − |
| Appearance/Coagulation | − | − | − | ++ | ++ | − | + | − | − | − | − | ± |
| Appearance/Sedimentation | + | + | ++ | ± | *2 | + | ± | + | + | ± | − | ± |
| Viscosity (mPa · s) | | 1.9 | | | 2.2 | | | 2.8 | | | 4.7 | |

[Criterion for evaluation of Appearance]
−: Not occurring at all,
±: Very slightly occurring,
+: Occurring,
++: Remarkably occurring
*1 Although no oil-off was observed, it was due to the strong coagulation of milk component.
*2 Although no sedimentation was observed, it was due to strong coagulatoin of milk component.

It is apparent that, in Comparative Example 21, the stability in storage at 60° C. increased due to the addition of 0.2 part of emulsifier and 0.1 part of microcrystalline cellulose preparation. However, none of the stabilities at 5, 25 and 60° C. can be considered sufficient. In Comparative Example 22, the state of the milk coffee became very good at 5 and 25° C. due to the addition of 0.2 part of emulsifier and 0.3 part of microcrystalline cellulose preparation. At 60° C., however, a severe coagulation occurred.

Examples 36-39

A sesame sauce for SHABUSHABU (sliced beef boiled with vegetables) with the following formulation was prepared by the use of the aqueous suspension-form compositions C and F and water-dispersible dry compositions H and J. First, the ingredients other than vinegar were agitated by means of a rotational homogenizer at 55° C. for 5 minutes, and then vinegar which had been twice diluted with water was added, and the resulting mixture was further agitated at 55° C. for 5 minutes. At this time, the water-dispersible dry compositions H and J were used after preliminary dispersion of 1.5% aqueous dispersion thereof with a rotational homogenizer at 10,000 rpm for 60 minutes at 80° C. The formation of the sesame sauce was shown in the following: granulated sugar 30%, sesame oil 7%, sesame paste 5%, edible salt 4%, vinegar 2%, product of the present invention 0.2% (solid) and xanthan gum 0.05%, the remainder being water. Then, the mixture was poured into a glass container, tightly stoppered, and heated and sterilized at 80° C. for 20 minutes. The sesame sauce sample thus obtained was left to stand at 25° C. for one month.

The sesame sauce is required to have an appropriate body feel (viscosity), as well as the stability of the system enough to prevent the separation of the sesame paste and oily component. The results of the evaluation of these properties are shown in Table 8.

TABLE 8

Results of evaluation of sesame sauce for SHABUSHABU

| | Example | | | |
| --- | --- | --- | --- | --- |
| | 36 | 37 | 38 | 39 |
| | Product of the present invention | | | |
| | Aqueous suspension-form composition | | Water-dispersible dry composition | |
| | C | F | H | J |
| Viscosity (mPa · s) *1 | 320 | 342 | 331 | 360 |
| Stability *2 | Uniform state with no separation nor coagulation | Uniform state with no separation nor coagulation | Uniform state with no separation nor coagulation | Uniform state with no separation nor coagulation |

*1 Viscosity was measured just after preparation of sample (rotational viscometer, shearing velocity 20 s⁻¹, at 25° C.). The viscometer used was Model RM-180, manufactured by Rheometric Scientific Inc.
*2 Stability was evaluated by visually examining the appearance.

Comparative Examples 23-29

Sesame sauces for SHABUSHABU were prepared according to Example 36, for the cases where the microfibrillated cellulose of Comparative Example 6 and aqueous cellulose dispersion c were used at prescribed concentrations, the case where the product of the present invention was not used (blank), and the case where the amount of xanthan gum was increased to 0.3% without blending the product of the present invention. The results of the evaluation are shown in Table 9.

TABLE 9

Results of evaluation of sesame sauce for SHABUSHABU

| | Comparative Example | | | | | | |
|---|---|---|---|---|---|---|---|
| | 23 | 24 | 25 | 26 | 27 | 28 | 29 |
| | | | Comparative product | | | | |
| | Fine cellulose | | Microfibrillated cellulose | | Aqueous dispersion of cellulose | Blank | Xanthan gum-increased system |
| Amount of comparative product (solid) (%) | 0.2 | 1 | 0.2 | 1 | 0.2 | 0 | 0 |
| Viscosity (mPa·s) *1 | 212 | 225 | 220 | 290 | 240 | 207 | — |
| Stability *2 | Transparent layer (29%) formed in the lower part | Transparent layer (8%) formed in the lower part | Transparent layer (22%) formed in the lower part | Transparent layer (6%) formed in the lower part | Transparent layer (11%) formed in the lower part | Transparent layer (32%) formed in the lower part | gelation |

*1 Viscosity was measured just after preparation of sample (rotational viscometer, shearing velocity 20 s$^{-1}$, at 25° C.). The viscometer used was Model RM-180, manufactured by Rheometric Scientific Inc.
*2 Stability was evaluated by visually examining the appearance.

The blank sample is low in viscosity and separation was observed (Comparative Example 28). The xanthan gum-increased system formed a gel, probably due to some interaction between the protein component in sesame and xanthan gum. On the other hand, none of the other comparative examples showed a sufficiently high stability, even though some of them showed a relatively high viscosity.

Comparative Examples 40-42

Using aqueous suspension-form compositions C and F and water-dispersible dry composition H as the products of the present invention, low-fat mayonnaise type dressings were prepared with the formulations mentioned below. First, water, a product of the present invention, xanthan gum and egg yolk were agitated in a Hobart mixer for 5 minutes at 150 rpm. Then, while continuing the agitation, rape seed oil was added at a rate of 20 g/min. and further agitated for 10 minutes. Subsequently, seasoning mixture powder and vinegar were added and further agitated for 5 minutes. Finally, the mixture was homogenized with a colloid mill (clearance: 10 mil, rotor rotation speed: 3,000 rpm) to obtain a dressing. The formulation of mixture was as follows: rape seed oil 35%, egg yolk 10%, vinegar 7%, product of the present invention 0.4% (solid), mixed seasoning powder (edible salt/salt/mustard powder/Na glutamate=26/9/4/1) 4%, and xanthan gum 0.3%, the remainder being water. Only the water-dispersible dry composition H was subjected to a preliminary dispersing treatment, namely dispersing a 1.5% aqueous dispersion thereof with a rotational homogenizer at 10,000 rpm for 60 minutes at 80° C., before being used.

The low-fat mayonnaise type dressing is required to have an appropriate body feel, and a sharp mouth feed without a pasty feel. The results of the evaluation of these properties are shown in Table 10.

Comparative Examples 30-32

A low-fat mayonnaise type dressings were prepared and evaluated according to Example 40 for the cases where the fine cellulose of Comparative Example 4 and the microfibrillated cellulose of Comparative Example 6 were used at prescribed concentrations, and the case where the amount of xanthan gum was increased to 0.6% without blending the product of the present invention. Results of their evaluation are shown in Table 10.

TABLE 10

Results of evaluation of low-fat mayonnaise type dressings

| | Example | | | Comparative Example | | |
|---|---|---|---|---|---|---|
| | 40 | 41 | 42 | 30 | 31 | 32 |
| | Product of the present invention/Comparative product | | | | | |
| | Aqueous suspension-form composition | | Water-dispersible dry composition | Fine cellulose | Micro fibrous cellulose | 0.6% xanthan gum-containing system |
| | C | F | H | | | |
| Amount of product of the present invention/Comparative product (solid) (%) | 0.4 | 0.4 | 0.4 | 2.5 | 1.5 | 0 |
| Viscosity (Pa.s)*1 | 22.0 | 21.3 | 20.8 | 21.1 | 20.5 | 19.1 |
| Mouth feel | Sharp feel without pasty feel | Sharp feel without pasty feel | Sharp feel without pasty feel | Sharp feel without pasty feel | Sharp feel without pasty feel | Pasty mouth feel |

*1 Viscosity was measured with rotational viscometer (Model RM180, manufactured by Rheometric Scientific Inc., Shear Rate 50 s$^{-1}$, at 25° C.).

When the product of the present invention was used, the dressings had a body (viscosity) comparable to that of regular (not low-fat) mayonnaise, and exhibited sharp but non-pasty mouth feel. On the other hand, in the cases where the fine cellulose and the microfibrillated cellulose were used, the amount of 2.5% or 1.5% thereof was necessary for obtaining a similar body. In the case of compounding xanthan gum only, a comparable viscosity was obtained by using it in an amount of 0.6%, but the dressing had a pasty mouth feel characteristic of water-soluble gum.

Examples 43-45

A custard pudding-like gel was prepared by using the water-dispersible dry compositions H, I and J as products of the present invention. First, the composition was weighed out so that the concentration of the product of the present invention came to 1%, hot water was added thereto, and the mixture was homogenized with an Ace Homogenizer at 15,000 rpm for 10 minutes at 80° C. To 5 parts of the dispersion were added hot water together with 10 parts of sugar, 8 parts of skim milk powder, 3 parts of coconut oil, 1 part of egg yolk, 0.5 parts of gelatin, 0.2 parts of agar, and 0.2 parts of glycerin fatty acid ester. After agitating and mixing the resulting mixture at 85° C. for 15 minutes, the mixture was one-pass treated with piston type homogenizer at 15 MPa to obtain a custard pudding solution. All the powdery starting materials as above were charged as calculated in terms of dry weight. Then, hot water was added so as to give a total weight of 100 parts.

Next, the custard pudding solution was filled into a glass heat-resistant bottle having a capacity of 100 mL, cooled in an atmosphere of 5° C. for one hour, and then heated and sterilized at 105° C. for 30 minutes to obtain a custard pudding-like gel. After allowing the gel to stand in an atmosphere of 5° C. for 24 hours, the appearance and mouth feel were evaluated. As a result, all the sample showed a uniform appearance without coagulation of milk protein or a transparent gel part formed by separation of milk component. As compared with the samples of Comparative Example 33 mentioned below, its mouth feel was smooth, fine in texture, and free of roughness.

Comparative Example 33

A custard pudding-like gel was prepared in the same manner as in Example 43, except that the water-dispersible dry composition H was not used. After allowing it to stand in an atmosphere of 5° C. for 24 hours, it was evaluated on appearance and mouth feel. As a result, the milk protein coagulated finely, and small amounts of transparent gels were formed at the bottom of container or in the upper part. The mouth feel was coarse-grained with a little roughness.

Example 46

A powdered green tea-pudding was prepared by using the water-dispersible dry composition J of the present invention. First, water-dispersible dry composition J was weighed out so that its concentration came to 1%, and added to hot water, and dispersed by means of an Ace Homogenizer at 15,000 rpm for 10 minutes at 80° C. To 5 parts of this dispersion was added hot water together with 12 parts of sugar, 7 parts of skim milk powder, 3 parts of coconut oil, 1.2 parts of powdered green tea, 1 part of egg yolk, 0.25 parts of κ-carrageenan, 0.2 parts of Locust bean gum, 0.2 parts of xanthan gum, and 0.2 parts of glycerin fatty acid ester. After agitating and mixing the mixture at 85° C. for 15 minutes, it was one-pass treated with a piston type homogenizer at 15 MPa to obtain a powdered green tea pudding solution. All the powdery starting materials were charged as calculated in terms of dry material, and hot water was added so as to give a total weight of 100 parts.

Subsequently, the pudding solution was filled in a 100 mL glass, heat-resistant bottle, and cooled in an atmosphere of room temperature for one hour to obtain a powdered green tea pudding. The pudding was heated and sterilized additionally at 105° C. for 30 minutes. Both the samples obtained above were left to stand in an atmosphere of 5° C. for 24 hours, after which their appearance and mouth feel were evaluated. As a result, both samples showed a uniform appearance wherein the green tea powder was present throughout the pudding. The mouth feel thereof was of fine-texture without rough feel, and the taste thereof remained constant until they were all eaten.

Comparative Example 34

A powdered green tea pudding was prepared in the same manner as in Example 46, except that the water-dispersible dry composition J was not used. In the sample before sterilization, a part of the powdered green tea precipitated to the bottom of the container. Although the mouth feel was good with a fine-texture, the taste varied from one part to another. In the sample after the sterilization, the powdered green tea had almost totally precipitated.

Example 47

A fruit juice-containing jelly was prepared by the use of the water-dispersible dry composition I of the present invention. First, water-dispersible dry composition I was weighed out so that concentration thereof came to 1%, added to hot water, and dispersed with an Ace Homogenizer at 15,000 rpm for 10 minutes at 80° C. Water and 7.5 parts of grapefruit juice (concentrated to 5 times its original concentration) were added to 10 parts of the dispersion and heated to 85° C., after which 10 parts of sugar, 4 parts of indigestible dextrin, 0.2 part of de-acylated Gellan gum and 0.1 part of calcium lactate were added and agitated to prepared a jelly solution. All the powdery materials were charged as calculated in terms of dry materials. The water was added so as to give a total amount of 100 parts.

Subsequently, the jelly solution was filled into a 100 mL glass, heat-resistant bottle and cooled in an atmosphere of 5° C. for one hour, after which it was heat-sterilized at 80° C. for 30 minutes or at 105° C. for 30 minutes to obtain a grapefruit juice-containing jelly. After allowing it to stand in an atmosphere of 5° C. for 24 hours, the appearance and mouth feel were evaluated. As a result, the product sterilized at 80° C. for 30 minutes was free of separation of water and crack formation, and showed a uniform appearance. The gel strength was 0.53N. The product sterilized at 105° C. for 30 minutes was also uniform in appearance and gel strength thereof was 0.51N. The mouth feels thereof were somewhat more intense in the juice taste as compared with the product of Comparative Example 35 (mentioned below) where the water-dispersible dry composition I was not added. The break-down pattern thereof was somewhat elongating. The mode of breaking thereof was fine in texture and smooth.

The gel strength (breaking strength) was measured without removing the jelly from the container, but directly in the bottle from which the lid had been removed, by means of "RHEO METER" Model NRM-2002J, manufactured by Fudo Kogyo, Co., Ltd., with a pushing-in in jig (10 mm$\phi$spherical jig), at a pushing speed of 6 cm/min.

Comparative Example 35

A grapefruit juice-containing jelly was prepared in the same manner as in Example 47, except that the water-dispersible dry composition I was not used. After allowing it to stand in an atmosphere of 5° C. for 24 hours, it was evaluated on appearance and mouth feel. As a result, a product sterilized at 80° C. for 30 minutes was free of separation of water and cracks and showed a uniform appearance. The gel strength was 0.60N. However, a product sterilized at 105° C. for 30 minutes, allowed separation of water on its upper surface, with formation of some cracks. Further, the concentration of fruit juice component was uneven, and the appearance was not uniform. The gel strength was 0.65N. (The high gel strength is probably due to shrinkage of gel, as suggested from the separation of water). In both cases, the mouth feels were hard and brittle (crispy), which was characteristic of Gellan gum. When it was tentatively crushed with tongue or teeth, it was difficult to crush finely and completely.

Example 49

A carrot jelly was prepared by the use of the gel-forming composition N of the present invention. To 72 parts of hot water (80° C.) were added 18 parts of steamed carrot, 4.5 parts of sugar, 4.5 parts of lemon juice and 1 part of the gel-forming composition N, and the mixture was dispersed. The dispersion was poured into a glass, heat-resistant bottle having an inner diameter of 45 mm and heat-sterilized at 80° C. for 30 minutes. Thus, a carrot jelly, free from water separation, coagulation and sedimentation of carrot fiber, was obtained. The gel strength was 0.09N. When it was heated at 60° C., it showed neither dissolution nor separation of water. The gel strength was 0.11N at 60° C.

The gel strength (breaking strength) was measured without removing the jelly from the container, but was measured directly in the bottle from which the lid had been removed, by means of "RHEO METER" Model NRM-2002J, manufactured by Fudo Kogyo, Co., Ltd., with a pushing-in jig (10 mm$\phi$spherical jig), at a pushing speed of 6 cm/min.

Comparative Example 36

Eighteen parts of steamed carrot, 4.5 parts of sugar, 4.5 parts of lemon juice, and 1.4 parts of gelatin were dispersed in 71.6 parts of hot water having a temperature of 80° C. and poured into a glass, heat-resistant bottle having an inner diameter of 45 mm. When it was immediately cooled to 5° C., separation of water was not observed, but most of the carrot precipitated to leave a transparent jelly behind as an upper layer. The gel strength was 0.07N at 5° C. When it was heated to 60° C., the gel melted, and the carrot precipitated completely.

Example 50

A rice-containing gel was prepared, using the gel-forming composition N of the present invention, to provide food for nursed patients. First, to 28.6 parts of commercially available retort rice 70.4 parts of water was added and agitated by means of a domestic mixer for 5 minutes. Then, 1 part of the product of the present invention was added, and the resulting mixture was dispersed with a rotational homogenizer ("T. K. Homomixer MARK II" Model 2.5 manufactured by Tokushu Kikakogyo, Co., Ltd.) at 6,000 rpm for 15 minutes, and packed into a glass-made heat-resistant bottle. After a heat-treatment at 105° C. for 30 minutes, the bottle was cooled with running water and then allowed to stand overnight in an atmosphere of 5° C. The gel thus obtained was free from separation and coagulation and its gel strength was 0.21N.

The gel strength was measured without taking out the gel composition from the vessel, but directly in the bottle from which the lid had been removed, by means of "RHEO METER" Model NRM-2002J, manufactured by Fudo Kogyo, Co., Ltd., with a pushing-in jig (10 mm$\phi$spherical jig), at a pushing speed of 2 cm/min.

Example 51

A pumpkin pudding was prepared by the use of the water-dispersible dry composition J of the present invention, to provide a food for nursed patients. First, a product of the present invention was added to hot water and agitated by means of an Ace Homogenizer at 15,000 rpm for 10 minutes at 80° C. Then, glucomannan was added thereto and dispersed to obtain a liquid dispersion having a formulation of 1.05% of composition J and 0.45% of glucomannan. To 50 parts of this dispersion were added 20 parts of steamed pumpkin, 24 parts of milk, 5.4 parts of sugar, 0.1 part of salt-free butter, and 0.1 part of salt, and the mixture was agitated and mixed together. The mixture was poured into a glass, heat-resistant bottle having an inner diameter of 45 mm and left to stand in an atmosphere of 5° C. for about one hour, and thereafter sterilized at 105° C. for 30 minutes. Thus, a uniform pumpkin pudding, which did not separate or coagulate was obtained.

The gel-strength was 0.15N at 25° C. When it was heated to 50° C., it showed a gel strength of 0.12N at 50° C., without melting and without separation of water. When the pumpkin pudding was eaten, the gel was lightly broken in the mouth, showing no pasty feel, and imparting a distinct impression of pumpkin and milk. It thus believed that the pumpkin pudding can be used for patients who must avoid solid foods. The pumpkin pudding can be eaten in a warmed state.

The gel strength was measured without taking out the gel composition from the vessel, but directly in the bottle from which the lid had been removed, by means of "RHEO METER" Model NRM-2002J, manufactured by Fudo Kogyo, Co., Ltd., with a pushing-in jig (10 mmϕspherical jig), at a pushing speed of 2 cm/min.

Comparative Example 37

Hot water having a temperature of 80° C. was added to agar to obtain an aqueous solution of agar having a concentration of 0.4%. To 50 parts of the aqueous solution were added 20 parts of steamed pumpkin, 24 parts of milk, 5.4 parts of sugar, 0.5 parts of salt-free butter and 0.1 part of salt. After agitating and mixing the mixture together, it was poured into a glass-made heat-resistant bottle having an inner diameter of 45 mm. After allowing it to stand in an atmosphere of 5° C. for about one hour, it was sterilized at 105° C. for 30 minutes. As a result, the system coagulated, and the pumpkin fibers gathered on the upper surface of the gel. When it was heated to 50° C. and tentatively eaten, it hardly gave the mouth the feel of a gel. The taste of pumpkin and milk were very thin.

Example 52

A miso soup gel was prepared by the use of the water-dispersible dry composition H, to provide a food for nursed patients. First, a product of the present invention was added to water at 80° C. and dispersed by means of an Ace Homogenizer at 15,000 rpm for 10 minutes at 80° C. Further, glucomannan was added and dispersed to obtain a liquid dispersion having a formulation of 1% of the composition H and 0.43% of glucomannan. To 70 parts of this dispersion was added a stirred mixture consisting of 21 parts of hot water (80° C.), 8 parts of white miso and 1 part of bonito-flavor seasoning, and the resulting mixture was agitated and mixed. The mixture thus obtained was poured into in a glass, heat-resistant bottle having an inner diameter of 45 mm, to which were added 5 pieces of TOFU having a shape of about 1 cm square. The bottle was allowed to stand in an atmosphere of 5° C. for about one hour. Thereafter, it was sterilized at 105° C. for 30 minutes. As a result, there was obtained a miso soup gel in which the tofu (soy-beam curd) pieces were uniformly distributed in the whole soup without separation of water and sedimentation. The gel strength was 0.09N at 25° C. When the gel was heated to 50° C., the gel did not melt nor allow separation of water, keeping a gel strength of 0.07N at 50° C. When it was eaten, the gel was broken in mouth lightly, showing no pasty feel and clearly exhibiting the tastes of miso and bonito-flavour, without any unpleasant feeling as a miso soup.

The gel strength was measured without removing the gel composition from the vessel, but was measured directly in the bottle from which the lid had been removed, by means of a "RHEO METER" Model NRM-2002J, manufactured by Fudo Kogyo, Co., Ltd., with a pushing-in jig (10 mmϕspherical jig), at a pushing speed of 2 cm/min.

Comparative Example 38

To 90.7 parts of hot water having a temperature of 80° C. were added 8 parts of white miso and 1 part of bonito-flavor seasoning, and the mixture was agitated and mixed. Further, 0.3 part of native type Gellan gum was added thereto, and agitated and mixed. The mixture was filled in a glass-made heat-resistant bottle having an inner diameter of 45 mm, to which were added 5 pieces of tofu having a shape of about 1 cm square, and the resulting mixture was allowed to stand in an atmosphere of 5° C. for about one hour, after which it was sterilized at 105° C. for 30 minutes. As a result, water was separated and two layers were formed (the solid component of miso and the tofu precipitated to the lower 50% volume region). When this product was heated to 50° C., the breaking strength (50° C.) was 0.06N which was comparable to that of Example 52. However, it had a wiggling texture when eaten, characteristic of native Gellan gum, which was very different from miso soup.

Example 53

The water-dispersible dry composition I (2.1 g) was weighed out, added to 297 g of hot water and dispersed by means of an Ace Homogenizer at 15,000 rpm for 10 minutes at 80° C. Glucomannan (0.9 g) (Propol A, manufactured by Shimizu Kagaku, Co., Ltd.) was added to the dispersion, and the mixture was further agitated for 10 minutes, and then the water lost by evaporation was supplemented. Thus, 300 g of a liquid mixture having a solid concentration of 1% was obtained. All the powdery materials were charged as calculated in terms of dry product. The liquid mixture (44 g) was poured into a wide mouth polycarbonate bottle having a capacity of 125 mL, and heated in a water bath kept at 80° C. for 3 hours, then cooled with running water for one hour, and frozen in the freezing chamber of a domestic freezer-refrigerator at −20° C. for 24 hours. Then, it was allowed to stand in an atmosphere of 40° C. for the sake of de-freezing to obtain a gel composition.

A thin piece of this gel was placed on a glass slide and observed under an optical microscope. It was found to have a sponge-like structure. The pores therein had a size of 20 μm×50 to 300 μm×400 μm. When pushed with a spatula, the gel released water with shrinkage of volume. When a sufficient quantity of water was added thereto, the gel absorbed the water and swelled to recover the original shape. That is, it was a sponge-like gel. When this gel had absorbed a sufficient quantity of water, it retained 125 times as great an amount of water as its solid weight. When the water was released by applying pressure with a spatula, it retained 20 times the amount of water as its solid weight. When the gel was eaten, a crunchy mouth feel was sensed. The gel strength (breaking strength) was 0.82N.

The gel strength (breaking strength) was measured after cutting the gel composition into a cube having a size of 10 mm (height)×20 mm (width)×30 mm (length), on which the gel strength was measured by means of a "RHEO METER" Model NRM-2002J, manufactured by Fudo Kogyo, Co., Ltd., with a pushing-in jig (0.3 mm piano wire jig), at a pushing speed of 6 cm/min.

Example 54

A gel composition was obtained in the same manner as in Example 53, except that the water-dispersible dry composition I was replaced with water-dispersible dry composition J; provided that the freezing was carried out by dipping the sample in ethanol adjusted to −45° C. with dry ice and thereafter allowing the sample to stand in a freezer kept at −25° C. for 3 hours. The de-freezing was carried out by allowing the sample to stand at room temperature.

A thin piece of this gel was placed on a glass slide and observed under an optical microscope. As a result, it was found to have a sponge-like structure, the pores of which had a size of 10 μm×20 μm to 50 μm×80 μm. When pushed with a spatula, the gel released water with shrinkage of volume. When a sufficient quantity of water was added thereto, the gel absorbed the water and swelled to recover the original shape. That is, it was a sponge-like gel. When the gel had absorbed a sufficient amount of water, it retained 85 times as great an amount of water as the solid weight thereof. When it was made to release the water by pushing it with the spatula, it retained 15 times as great an amount of water as its solid weight. When this gel was eaten, it exhibited a crunchy mouth feel. The gel strength was 0.56N.

Comparative Example 39

The procedure of Example 53 was repeated, except that the water-dispersible dry composition I was replaced with a crystalline cellulose complex ("Avicel" RC-591, manufactured by Asahi Kasei Kabushiki Kaisha). However, the content after de-freezing had a fluidity, and assumed no appearance of gel.

Comparative Example 40

Hot water (294 g) was added to 6 g of commercially available microfibrillated cellulose ("Celish" FD-100G, manufactured by Daicel Kagaku Kogyo, Co., Ltd.) and dispersed with an Ace Homogenier at 15,000 rpm for 10 minutes, at 80° C. to obtain 300 g of a dispersion having a solid content of 2%. Then, 291 g of hot water was added to 9 g of glucomannan (Propol A, manufactured by Shimizu Kagaku, Co., Ltd.) and dispersed by means of an Ace Homogenizer at 15,000 rpm for 10 minutes at 80° C. to obtain 300 g of a liquid dispersion having a solid content of 3%. By means of TK Homomixer, 280 g of the 2% dispersion of microfibrillated cellulose and 100 g of 3% dispersion of glucomannan were uniformly mixed at 8,000 rpm for 5 minutes at 25° C., to obtain 380 g of a liquid mixture having a solid content of 2.26%. The mixture (44 g) was filled into a wide mouth polycarbonate bottle having a capacity of 125 mL, frozen at −20° C. for 60 hours, and allowed to stand at room temperature to obtain a gel.

The gel strength of this gel was not measurable, because it exceeded the limit of measurement (19.6N) of the apparatus. When it was tentatively eaten, it was almost too hard to bite off, and, thus, could not be considered edible by any means.

Example 55

A lacto-ice was prepared by the use of the product of the present invention. Therefor, 10 parts of millet jelly was introduced into 55.45 parts of water heated to 40° C. While stirring and mixing the mixture, 10 parts of defatted milk powder, 10 parts of sugar, 10 parts of aqueous suspension-form composition D (solid concentration 0.5% by weight) and 0.25 part of glycerin fatty acid ester were added thereto. Then, 4 parts of coconut oil was added and the resulting mixture was stirred and dissolved at 80° C. for 10 minutes. After homogenizing the mixture with a piston type homogenizer, 0.3 parts of vanilla extract was added and aged at 5° C. for 16 hours. Then, the mixture was subjected to freezing and hardened to obtain a lacto-ice.

Although the lacto-ice thus obtained had a body feel, its mouth feel was excellent in melting feeling in the mouth without any pasty feeling. Its heat-shock resistance was also good.

Example 56

A caesar salad dressing with a feeling of the body which was easy to be caught in the salad was prepared by the use of the product of the present invention. First, water-dispersible dry composition J was added to hot water having a temperature of 80° C., and dispersed at 15,000 rpm for 5 minutes by means of an Ace Homogenizer to obtain a dispersion having a concentration of 1% by weight. Then, into 20 parts of this dispersion were successively mixed 25 parts of commercially available mayonnaise, 6 parts of apple vinegar, 5 parts of sugar, 4 parts of lemon juice, 3 parts of salt, 1.5 parts of powdered cheese, 0.1 part of sodium glutamate, 0.05 part of garlic powder, 0.05 part of roughly ground pepper, 0.05 part of roughly ground red pepper, 0.2 part of xanthan gum, and water to make the whole weight 100 parts. Finally, the mixture was agitated by means of TK Homomixer at 7,000 rpm for 12 minutes at 80° C. to obtain a homogenized mixture, which is then sterilized.

Static viscosity (measured with B-type viscometer, rotor No. 3, 12 rpm, 25° C.) was as high as about 2.3 Pa·s; and shaking viscosity was about 2 Pa·s. Regarding the mouth feel. The dressing had a intense feeling of the body, while it was melting in your mouth without a pasty texture. When the dressing was poured out of a container, it followed smoothly. When the dressing was stored for one month at 25° C., it kept a uniform appearance, without separation of oil and water, and without coagulation and precipitation of spices.

Comparative Example 41

A Caesar salad dressing was prepared according to Example 56, except that the water-dispersible dry composition J was not used and the xanthan gum was used in an amount of 0.3 part.

The static viscosity and shaking viscosity were about 2.4 Pa·s. Although the body feel was high, an intense pasty feel (uneasiness in melting in the mouth, a paste-like feeling) was simultaneously felt. When the dressing was poured out of a container, it became a lump, and did not frow smoothly.

INDUSTRIAL APPLICABILITY

The fine-fibrous cellulose of the present invention can provide various food products with a bodily feeling and stabilities (heat stability, suspension stability, etc.) without any adverse influence on the mouth feel of the food products. Further, by combining it with a specific polysaccharide, a gel excellent in heat resistance and a gel having a novel mouth feel can be provided. The fine-fibrous cellulose of the present invention can be produced from cellulose derived from inexpensive plant cell wall, by an economical process.

The invention claimed is:
1. A water-dispersible cellulose,
the water-dispersible cellulose being derived from a plant cell wall having starting cellulosic substance, wherein the starting cellulosic substance has an α-cellulose content of 60-90% by weight and an average degree of polymerization of 400-1300, or the starting cellulosic substance has an α-cellulose content of 60-100% by weight and an average degree of polymerization greater than 1,300, the water-dispersible cellulose being crystalline having a crystallinity of 55% or more, and fine fibrous without entanglement between fibers, and the water-dispersible cellulose having substantially no branched bundles of fiber, the water-dispersible cellulose comprising 30% by weight or more of a component stably suspensible in water, wherein the component comprises a fibrous cellulose having a length (major axis) of 0.5-30 μm and a width (minor axis) of 2-600 nm, and a length/width ratio (major axis/minor axis) of 20-400, and the water-dispersible cellulose having a loss tangent of less than 1, when made into a 0.5% by weight aqueous dispersion.

2. The water-dispersible cellulose according to claim 1, comprising 50% by weight or more of the component stably suspensible in water and having the loss tangent of less than 0.6, when made into a 0.5% by weight aqueous dispersion.

3. An aqueous suspension-form composition, comprising: the water-dispersible cellulose according to claim 1 or 2 in an amount of 0.0005-7% by weight and water.

4. A food composition, comprising: the water-dispersible cellulose according to claim 1 or 2.

5. A water-dispersible cellulose, the water-dispersible cellulose being derived from a plant cell wall having starting cellulosic substance, wherein the starting cellulosic substance has an α-cellulose content of 60-90% by weight and an average degree of polymerization of 400-1300, or the starting cellulosic substance has an α-cellulose content of 60-100% by weight and an average degree of polymerization greater than 1,300, the water-dispersible cellulose being crystalline having a crystallinity of 55% or more, and fine fibrous, and the water-dispersible cellulose comprising 30% by weight or more of a component stably suspensible in water after being centrifuged at 1,000 G for 5 minutes, wherein the component comprises a fibrous cellulose having a length (major axis) of 0.5-30 μm and a width (minor axis) of 2-600 nm, and a length/width ratio (major axis/minor axis) of 20-400, and the water-dispersible cellulose having a loss tangent of less than 1, when made into a 0.5% by weight aqueous dispersion.

* * * * *